United States Patent [19]

Hara et al.

[11] Patent Number: 5,287,137
[45] Date of Patent: Feb. 15, 1994

[54] ENCODER DEVICE

[75] Inventors: Minoru Hara, Hachioji; Kazuhiro Satoh, Sagamihara, both of Japan

[73] Assignee: Olympus Optical Co., Ltd., Tokyo, Japan

[21] Appl. No.: 13,106

[22] Filed: Feb. 3, 1993

[30] Foreign Application Priority Data

Feb. 3, 1992 [JP] Japan .................. 4-17917

[51] Int. Cl.⁵ .................................. G03B 1/18
[52] U.S. Cl. .................. 354/195.12; 354/289.11; 354/289.12; 355/61
[58] Field of Search ........ 354/195.12, 195.13, 354/289.11, 289.12; 355/61, 62

[56] References Cited

U.S. PATENT DOCUMENTS

| | | | |
|---|---|---|---|
| 3,832,058 | 8/1974 | Gusovius | 355/61 |
| 3,992,097 | 11/1976 | Jensen | 355/61 |
| 4,451,142 | 5/1984 | Takenaka et al. | 355/61 |
| 4,825,237 | 4/1989 | Hatase et al. | 354/195.12 |
| 5,016,993 | 5/1991 | Akitake | 354/195.13 |

*Primary Examiner*—Monroe H. Hayes
*Attorney, Agent, or Firm*—Louis Weinstein

[57] ABSTRACT

An encoder device of the present invention comprises:
a motor for driving a photographing lens,
a pulse generator operated by a drive force transmitted from the motor to the photographing lens, and generating a coarse pulse signal and a fine pulse signal corresponding to rotation of the motor,
counters for counting the coarse pulse signal and the fine pulse signal, respectively,
a reset device for resetting the number of the coarse pulse signals counted by the counters when the photographing lens reaches a predetermined position,
a motor drive/controller for controlling start and stop of drive of the motor, and
a detector for determining a value related to the driven position of the photographing lens upon halting of the driving of the motor based on the number of the coarse pulse signals counted from the predetermined position for resetting and the number of the fine pulse signals counted after a final one of the coarse pulse signals has been output.

54 Claims, 16 Drawing Sheets

ENCODER DEVICE

BACKGROUND OF THE INVENTION

1. Field of the Invention

The present invention relates to an encoder device, and more particularly to an encoder device for use in a focal length detector of a photographic zoom optical system in a camera or the like.

2. Related Art Statement

As is well known, a focal length detector of a photographing zoom optical system in a camera or the like employs a zoom encoder for detecting the amount and direction of rotation of a cam ring which is rotatable about an optical axis of the photographing optical system to change the focal length of the photographing optical system.

Conventionally, as is shown in FIG. 20, such an encoder for zooming etc. has been practiced by utilizing combinations of signals output upon contact pieces 308, formed of a conductor, sliding over patterns 312 which are made up by, for example, plating gold on the surface of an insulator 301.

In other words, to detect the rotational position of a cam ring which is rotated to carry out zooming etc., the illustrated encoder is provided with a code plate of several bits and brushes are brought into contact the code plate with for producing bit information from which the rotational position of the cam ring is detected. While this means for detecting the rotational position by using the code plate is advantageous in that the rotational position of the cam ring can be detected based on bit information from the code plate, it has disadvantages as set forth below:

1) the production cost of the code plate is high;

2) because of bit information being obtained from contact between the code plate and the brushes, oxidation of the code plate surface and the brush surface cause conduction failures with time; and 3) insufficient contact pressure, surface wearing, etc. also cause conduction failures with time.

Of these disadvantages, 2) and 3), i.e., the occurrence of failures with time, implies that such failures occur after products have been handed over to users and, therefore, are particularly quite critical problems from the standpoint of product quality.

For thoroughly solving the above disadvantages 2) and 3), therefore, it could be envisaged to replace the above-mentioned contact type encoder by a contactless absolute value encoder of the optical type using a photo-reflector etc. or the magnetic type using an MR element, etc.

Contrary to the intention, however, the above replacement means have substantial demerits in points of space and cost. These demerits become more severe as resolution of the zoom encoder is increased. The limit in practical use is on the order of 2 to 3 bits at maximum.

In view of the above, as disclosed in Japanese Utility Model Laid-Open No. 2-51310, there has been proposed such a means instead of the conventional contact type encoder that an optical pulse generator is provided which generates a pulse in response to rotation of a cam ring used for zooming etc., and the number of pulses output from the generator is counted up or down depending on the direction of rotation of the cam ring for zooming, to thereby determine the rotational position of the cam ring. This means enables a high-resolution encoder to be obtained by using only one photo-interrupter.

In such a zoom encoder using a photo-interrupter, a rotating plate with a slit and a corresponding photo-interrupter are arranged midway a train of reduction gears leading from a zoom motor to the cam ring, the rotating plate with the slit is rotated with rotation of the zoom motor, and a signal generated from the photo-interrupter is used to determine the rotational position of the cam ring. For obtaining a high-accuracy (high-density) signal from the above encoder, the photo-interrupter is required to be arranged near the first stage of the reduction gear train, i.e., in a portion rotating at a high speed. However, because the reduction gear train includes many speed reducing gears from the first stage to the output gear stage, there essentially occur large amounts of backlash. Stated otherwise, since large amounts of backlash are present between the photo-interrupter arranged near the first stage and the cam ring, there is no linear relation between an output of the photo-interrupter and the cam ring, meaning the presence of problems in accuracy.

OBJECTS AND SUMMARY OF THE INVENTION

A first object of the present invention is to provide an encoder device which has high accuracy, occupies a not so large space, and is manufactured at low cost.

A second object of the present invention is to provide an encoder device which can precisely detect the amount or position of movement, even if backlash is present in a transmission system leading from a drive source to a driven member, without being affected by backlash.

A third object of the present invention is to provide an encoder device in which a small capacity memory or a small portion of a memory suffices for counting.

A fourth object of the present invention is to provide an encoder device which causes almost no false detection due to count error even when driving is repeated.

In summary, an encoder device of the present invention comprises:

a motor for driving a photographing lens, pulse generating means operated by a drive force transmitted from said motor to said photographing lens, and generating a coarse pulse signal and a fine pulse signal corresponding to rotation of said motor, count means for counting said coarse pulse signal and said fine pulse signal, respectively, reset means for resetting the number of said coarse pulse signals counted by said count means when said photographing lens reaches a predetermined position, motor drive/control means for controlling starting and stopping of driving of said motor, and detection means for determining a value related to the driven position of said photographing lens upon stopping of drive of said motor based on the number of said coarse pulse signals counted from said predetermined position for resetting and the number of said fine pulse signals counted after the fast of said coarse pulse signals has been output.

These objects and advantages of the present invention will become further apparent from the following detailed explanation and drawings.

DETAILED DESCRIPTION OF THE PREFERRED EMBODIMENTS

Hereinafter, preferred embodiments of the present invention will be described with reference to the drawings.

Figure 1:
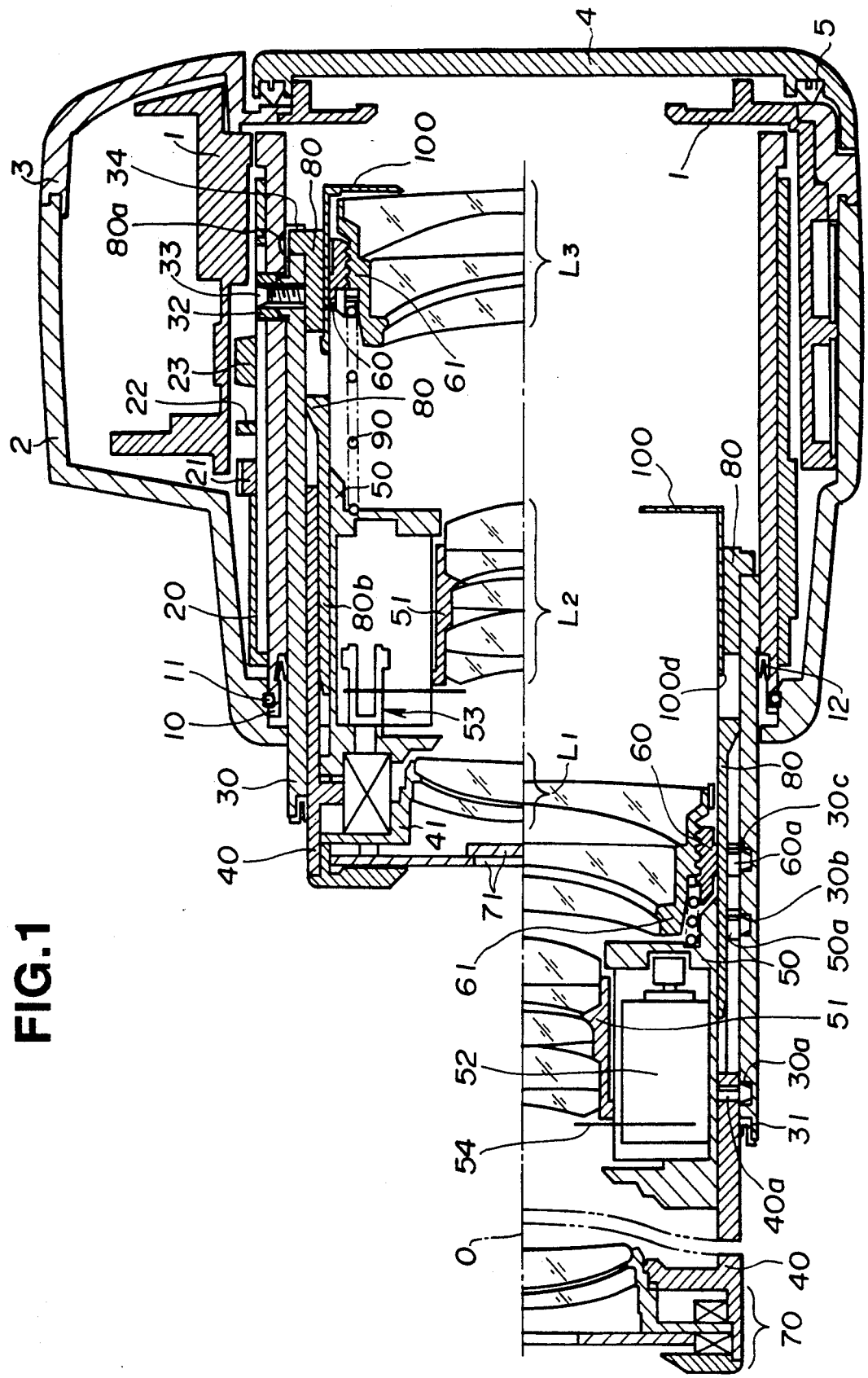
FIG. 1 is a sectional view of the principal parts of a zoom camera to which an encoder device of the present invention is applied.
Figure 2:
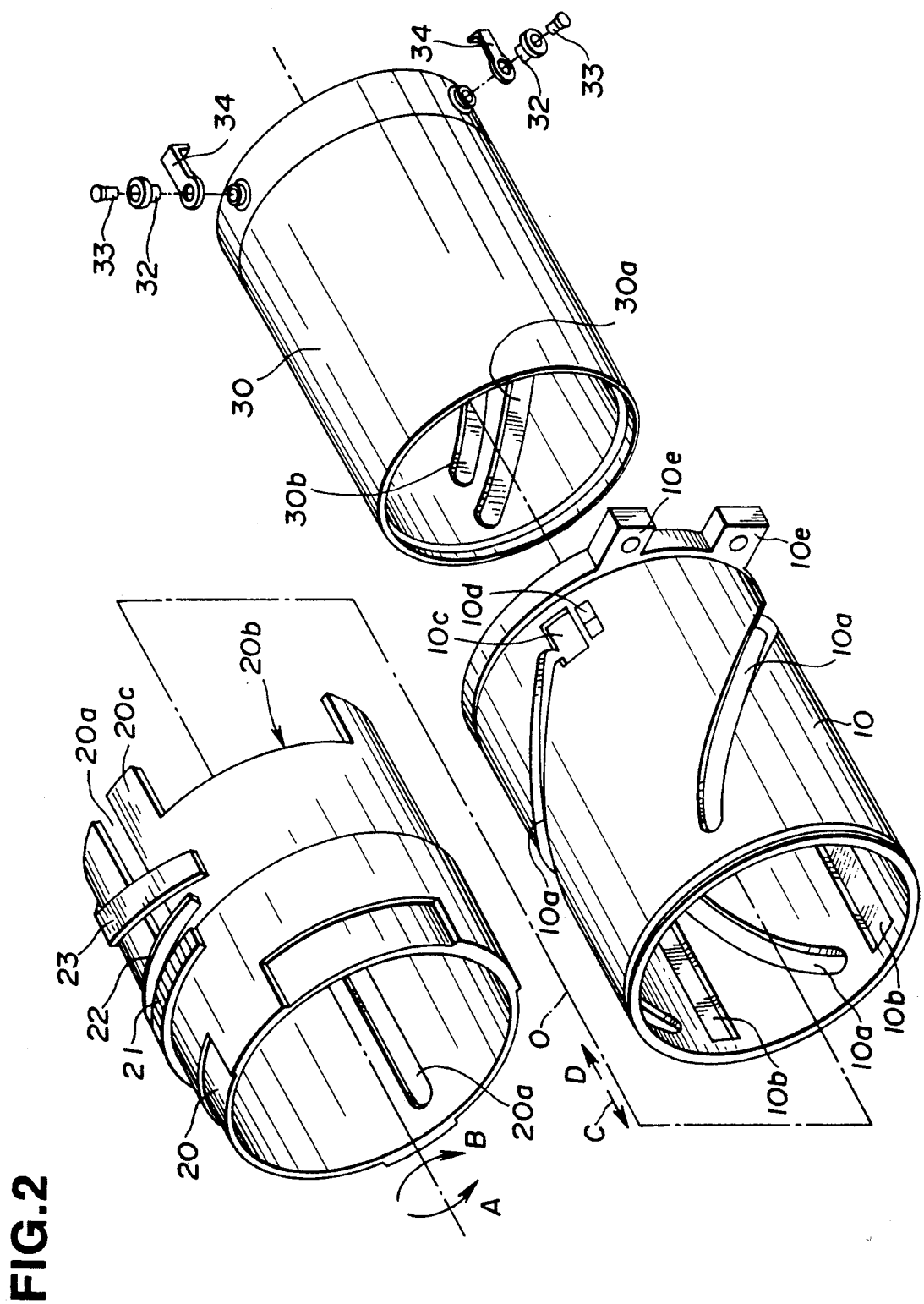
FIG. 2 is an exploded perspective view in which components of a lens barrel in the zoom camera are disassembled and arrayed in the direction of an optical axis.
Figure 3:
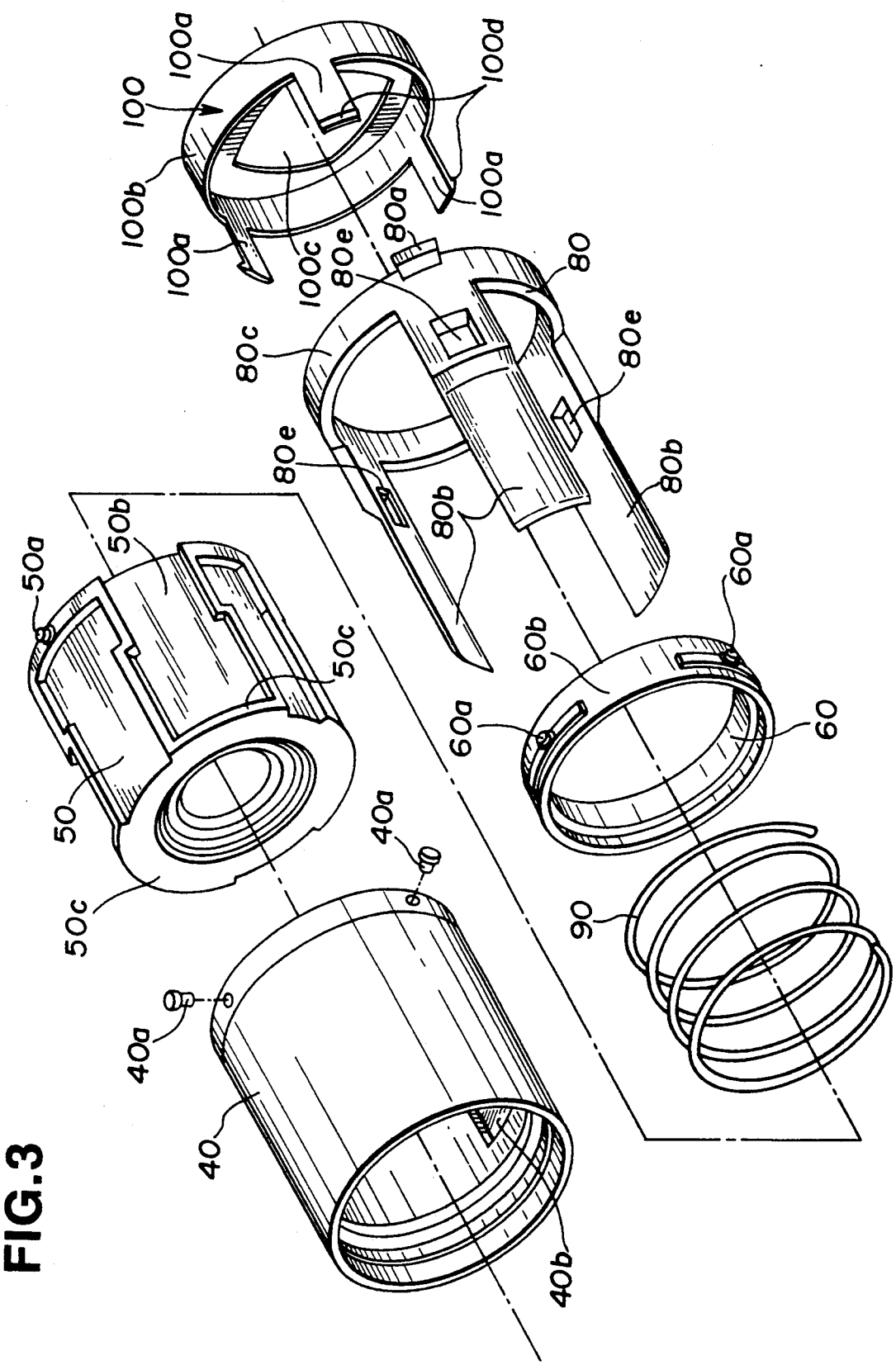
FIG. 3 is an exploded perspective view in which other components of the lens barrel in the zoom camera of the first embodiment are disassembled and arrayed in the direction of the optical axis.

FIG. 1 is a sectional view of principal parts of a zoom camera to which an encoder device showing a first embodiment of the present invention is applied, and FIGS. 2 and 3 each show an exploded perspective view in which components of a lens barrel in the zoom camera of FIG. 1 are disassembled and arrayed in the direction of an optical axis.

In this first embodiment, the present invention is applied to a zoom lens barrel. The zoom lens barrel includes a stationary cylinder 10 attached integrally to a camera body 1. An upper half of FIG. 1 shows a wide-angle state where a zoom lens is moved to a wide-angle position, while a lower half of FIG. 1 shows a telephoto state where the zoom lens is moved to a telephoto position.

A camera having such a lens barrel comprises a front cover 2 for covering a front portion of the camera body 1, a rear cover 3 covering a rear position of the camera body 1, and a back lid 4. The back lid 4, attached by a hinge (not shown) to the rear cover 3 to be capable of opening and closing, is closed in an optically sealed (i.e. light-tight) manner with the aid of a light shielding elastic member 5.

The zoom lens barrel comprises a drive cylinder 20 rotatably fitted over an outer circumference of the stationary cylinder 10 and prevented from moving in the direction of the optical axis;

a cam cylinder 30 fitted to an inner circumference of the stationary cylinder 10 and driven by the drive cylinder 20 to move back and forth in the direction of the optical axis O while rotating;

a first lens cylinder 40, a second lens cylinder 50 and a third lens cylinder 60 disposed in the cam cylinder 30 in this order from the front and individually movable back and forth in the direction of the optical axis;

a float key 80 also disposed in the cam cylinder 30, prevented by a key receiving member 34 from moving in the direction of the optical axis, and prevented by the stationary cylinder 10 from rotating about the optical axis to thereby restrict rotation of the first lens cylinder 40, the second lens cylinder 50 and the third lens cylinder 60 about the optical axis;

a barrier unit 70 (see FIG. 1) disposed in the front side of the first lens cylinder 40 and having a barrier 71 opened and closed by a barrier driver 53 (see FIG. 1) supported in the second lens cylinder 50;

a shutter blade 54 (see FIG. 1) opened and closed by a shutter unit 52 (see FIG. 1) supported in the second lens cylinder 50;

an elastic member 90 in the form of a coil spring stretched between the second lens cylinder 50 and the third lens cylinder 60 for absorbing play in fitting between drive rollers 50a, 60a and cam slots 30b, 30c (described later); and a flare diaphragm 100 attached to a rear portion of the float key 80.

The drive cylinder 20 includes a drive gear 21, a guide rib 22 and an interlock cam 23 which are all provided on its outer circumferential surface in the form of a partial circular arc and are arranged in this order from the front. The drive gear 21 and the guide rib 22 are disposed with a spacing therebetween corresponding to the diameter of a guide pin (not shown) which is provided integrally with a finder frame 110 (not shown).

The drive gear 21 receives a drive force from a zoom drive unit (not shown) and rotates the drive cylinder 20 in the counterclockwise direction (arrow A) or in the clockwise direction arrow B (see FIG. 2) about an optical axis O, the rotation of the drive cylinder 20 being guided by the guide rib 22. The interlock cam 23 serves to move a lens of a finder optical system (not shown) for a zooming operation. Further, the drive cylinder 20 has elongate guide slots 20a bored at respective positions trisected in the circumferential direction and extending in the direction of the optical axis, and a cut-out 20b formed at its rear end for allowing a date imprinting beam from a data unit (not shown) to pass therethrough.

The stationary cylinder 10 has leading cam slots 10a bored to extend over respective regions circumferentially trisecting its circumferential surface for moving the cam cylinder 30 back and forth in the direction of the optical axis while rotating it, and straightforward guide grooves 10b formed in its inner circumferential surface at respective positions circumferentially trisecting the same for fitting with later-described guide projections 80a of the float key 80. Then, as shown in FIG. 2, a rectangular through hole 10c with longer sides extending in the direction of the optical axis is formed in a rear end portion of the stationary cylinder 10, facing the film plane side, at a position adjacent to a terminal end of one of the cam slots 10a which locates in the upper side of the camera.

The through hole 10c is arranged to be superposed with the cut-out 20b of the drive cylinder 20 when an actual exposure is made, so that it passes the date imprinting beam from the data unit (not shown), such as a data imprinting means, toward the film plane. On the opposite side of the through hole 10c to the terminal end of the cam slot 10a, there is provided a stop projection 10d on the outer circumferential surface of the stationary cylinder 10 for restricting the extend of rotation of the drive cylinder 20. Note also that lugs 10e provided at a rear end of the stationary cylinder 10 to radially project therefrom are used for mounting the zoom lens barrel to the camera body 1.

The cam cylinder 30 fitted to the inner circumference of the stationary cylinder 10 has cam grooves 30a formed in its inner circumferential surface to extend over respective regions circumferentially trisecting the same for moving the first lens cylinder 40 in the direction of the optical axis for zooming operation, and cam grooves 30b, 30c likewise formed in its inner circumferential surface to extend over respective regions circumferentially trisecting the same for moving the second and third lens cylinders 50, 60, respectively, in the direction of the optical axis for zooming operation.

Figure 5:
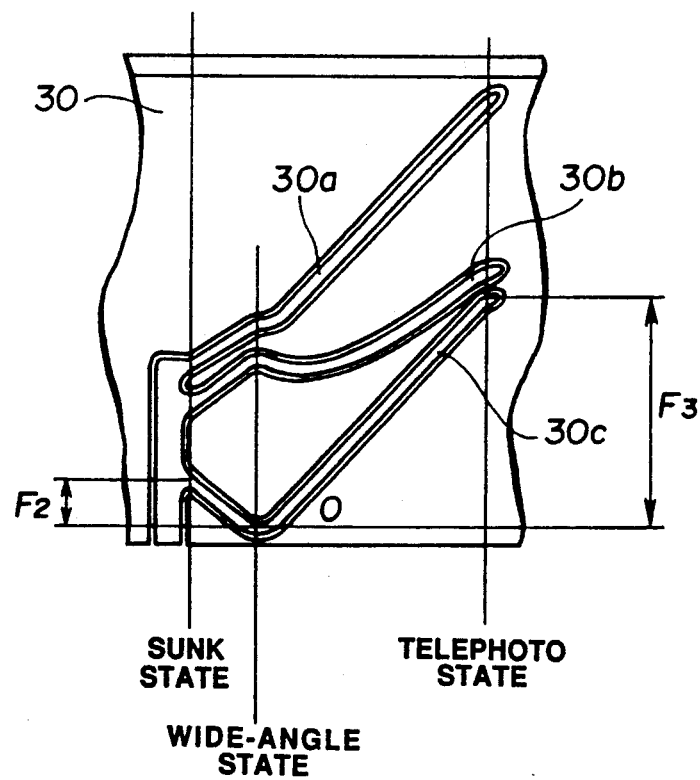
FIG. 5 is a plan view showing cam grooves in the zoom camera of FIG. 1.

Configurations of the cam grooves 30a to 30c are detailed in FIG. 5. FIG. 5 shows a part of the inner circumferential surface of the cam cylinder 30 which is cut away and developed into a flat form. In FIG. 5, the reference character F2 indicates a distance through which the third lens cylinder 60 moves with respect to the float key 80 when lens groups are shifted from a wide-angle state to a sunk state. Also, the reference character F3 indicates a distance through which the third lens cylinder 60 moves with respect to the float key 80 when the lens groups are shifted from a wide-angle state to a telephoto state.

Referring to FIG. 2 again, drive rollers 32 for the zooming operation are fixed by screws 33 to an outer circumferential surface of the cam cylinder 30 in its rear end at respective circumferentially trisected positions. The drive rollers 32 penetrate through the cam slots 10a of the stationary cylinder 10 and are fitted into an associated one of the elongate guide slots 20a of the drive cylinder 20. Accordingly, when the drive cylinder 20 is rotated about the optical axis O, the drive rollers 32 for the zooming operation are also rotated through the elongate guide slots 20a so that the cam cylinder 30 is moved back and forth in the direction of the optical axis O while rotating to follow the cam slots 10a.

The first lens cylinder 40 has a lens support frame 41 fixed therein to its front portion for holding a first lens group L1 (see FIG. 1), and relatively wide guide grooves 40b (see FIG. 3) extending in the direction of the optical axis and formed in its inner circumferential surface at respective positions circumferentially trisecting the same. Later-described key portions 80b of the float key 80 are fitted at their outer surface sides in the guide grooves 40b, whereby the first lens cylinder 40 is restricted so as to move only linearly in the direction of the optical axis. Drive rollers 40a are fixed to an outer circumferential surface of the first lens cylinder 40 in its rear end at respective circumferentially trisected positions, the drive rollers 40a being fitted in the cam grooves 30a of the cam cylinder 30.

The second lens cylinder 50 has a lens support frame 51 fixed therein for holding a second lens group L2 (see FIG. 1), and relatively circumferentially wide guide recesses 50b each having a front end wall 50c and opened rearwardly, the guide recesses 50b extending in the direction of the optical axis and being formed in its outer circumferential surface at respective positions circumferentially trisecting the same. The key portions 80b of the float key 80, fitted at their outer surface sides in the guide grooves 40b as mentioned above, are fitted at their inner surface sides in the guide recesses 50b, whereby the second lens cylinder 50 is restricted so as to move linearly only in the direction of the optical axis. Thus, the key portions 80b of the float key 80 are held in sandwiched relation between the guide grooves 40b and the guide recesses 50b. A drive roller 50a is fixed to the outer circumferential surface of the second lens cylinder 50 in its rear end at a position between every adjacent pair of the guide recesses 50b. In other words, the drive rollers 50a are fixed to the outer circumferential surface of the second lens cylinder 50 in its rear end at respective circumferentially trisected positions. The drive rollers 50a are fitted in the cam grooves 30b of the cam cylinder 30.

Incidentally, the shutter unit 52 and the shutter blade 54 are provided in the second lens cylinder 50, as mentioned above, to be moved back and forth together with the second lens cylinder 50.

The third lens cylinder 60 has a lens support frame 61 fixed therein for holding a third lens group L3 (see FIG. 1), and relatively wide guide cut-outs 60b extending in the circumferential direction and formed in its outer circumferential surface at respective positions circumferentially trisecting the same. The key portions 80b of the float key 80 held between the guide grooves 40b and the guide recesses 50b are fitted to the guide cut-outs 60b, whereby the third lens cylinder 60 is restricted so as to move linearly only in the direction of the optical axis. A drive roller 60a is fixed to the outer circumferential surface of the third lens cylinder 60 at a position between every adjacent pair of the guide cut-outs 60b. In other words, the drive rollers 60a are fixed to the outer circumferential surface of the third lens cylinder 60 at respective circumferentially trisected positions. The drive rollers 60a are fitted in the cam grooves 30c of the cam cylinder 30.

Between a front end face of the third lens cylinder 60 and a rear end face of the second lens cylinder 50, the elastic member 90 in the form of a coil spring is stretched to absorb play in fitting between the drive rollers 50a, 60a and the cam slots 30b, 30c, respectively.

The float key 80 is comprised of an annular base 80c having a front portion fitted to the inner circumference of the cam cylinder 30 in its rear end portion, three key portions 80b extending forwardly from a front face of the annular base 80c at respective circumferentially trisected positions, rectangular fitting holes 80e bored in the key portions 80b at positions nearer to the annular base 80c, respectively, with their long sides extending in the direction of the optical axis, and guide projections 80a formed on an outer circumferential surface of the annular base 80c in its rear end at respective circumferentially trisected positions, the guide projections 80a being fitted in the straightforward grooves 10b of the stationary cylinder 10.

The float key 80 is received at a rear end face of the annular base 80c by key receiving members 34, which are fixed in place by the aforesaid screws 33 at the same time as when the drive rollers 32 for zooming operation are fixed by the screws 33 to the outer circumferential surface of the cam cylinder 30 in its rear end at respective circumferentially trisected positions. The float key 80 is thereby movable in the direction of the optical axis together with the cam cylinder 30, but prevented from rotating about the optical axis O as the guide projections 80a are fitted in the straightforward grooves 10b of the stationary cylinder 10. Further, the three key portions 80b extending forwardly are inserted and fitted in the guide cut-outs 60b of the third lens cylinder 60, the guide recesses 50b of the second lens cylinder 50, and the guide grooves 40b of the first lens cylinder 40.

The flare diaphragm 100 (see FIG. 3) is comprised of an annular circumferential wall 100b formed to extend forwardly from the outer circumferential edge of a thin disk which has a flare diaphragm aperture 100c bored at the center, integral resilient attachment lugs 100a extending forwardly from a front face of the annular circumferential wall 100b at respective circumferentially trisected positions, and lock pawls 100d formed on outer surfaces of the attachment lugs 100a at their front ends. The flare diaphragm 100 is fitted into the float key 80 from the rear side along its inner circumferential wall surface to be out of interference with the third lens cylinder 60, and the lock pawls 100d of the attachment lugs 100a are resiliently engaged in the rectangular fitting holes 80e of the float key 80. The flare diaphragm 100 is thereby attached to a rear portion of the float key 80 in such a manner as to be able to move in the direction of the optical axis through a distance corresponding to the length of the fitting holes 80e.

Incidentally, as shown in FIG. 1, an O ring 11 is disposed between the inner circumferential surface of the front cover 2 at its front end portion and the outer circumferential surface of the stationary cylinder 10 at its front end portion to provide optical (i.e. light) and fluid sealing. Likewise, elastic rings 12, 31 are disposed between the inner circumferential surface of the stationary cylinder 10 at a position nearer to its front end and the outer circumferential surface of the cam cylinder 30 and between the front end face of the cam cylinder 30 and the outer circumferential surface of the first lens cylinder 40, respectively, to provide optical (i.e. light) and fluid sealing.

A description will now be given of a principal part of the present invention by referring to FIG. 6.

Figure 6:
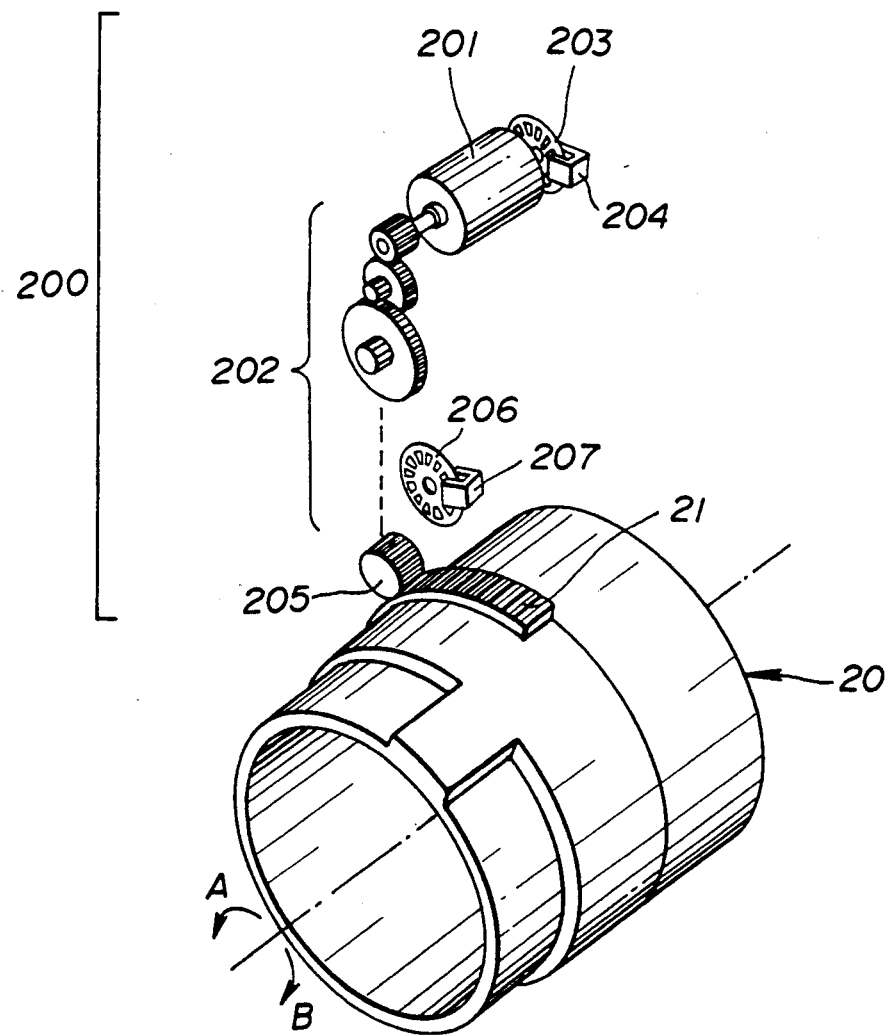
FIG. 6 is a perspective view of an encoder device showing a first embodiment of the present invention.

FIG. 6 shows an encoder device according to a first embodiment of the present invention, the encoder device being applied to a zoom lens barrel of a camera.

A zoom motor driver 200 comprises a zoom motor 201, a reduction gear train 202, a fine signal slit disk 203 provided on an extended shaft of the zoom motor 201 and rotatable together with the zoom motor 201, a fine signal photo-interrupter 204 (ZPI 204) arranged near the fine signal slit disk 203 for producing an output signal upon rotation of the slit disk 203, an output gear 205 held in mesh with both a final gear of the reduction gear train 202 and the aforesaid drive gear 21 provided on the outer circumference of the drive cylinder 20 for transmitting torque of the zoom motor 201 to the drive cylinder 20, a coarse signal slit disk 206 provided on a gear shaft of one reduction stage near the output gear 205 and rotatable together with rotation of the gear shaft, and a coarse signal photo-interrupter 207 (ZPI 207) for producing an output signal upon rotation of the coarse signal slit disk 206.

Output terminals of the fine signal photo-interrupter 204 and the coarse signal photo-interrupter 207 are connected to a later-described CPU 101 (see FIG. 7) which detects the current focal length based on the output signals of both of the photo-interrupters 204 and 207.

Figure 7:
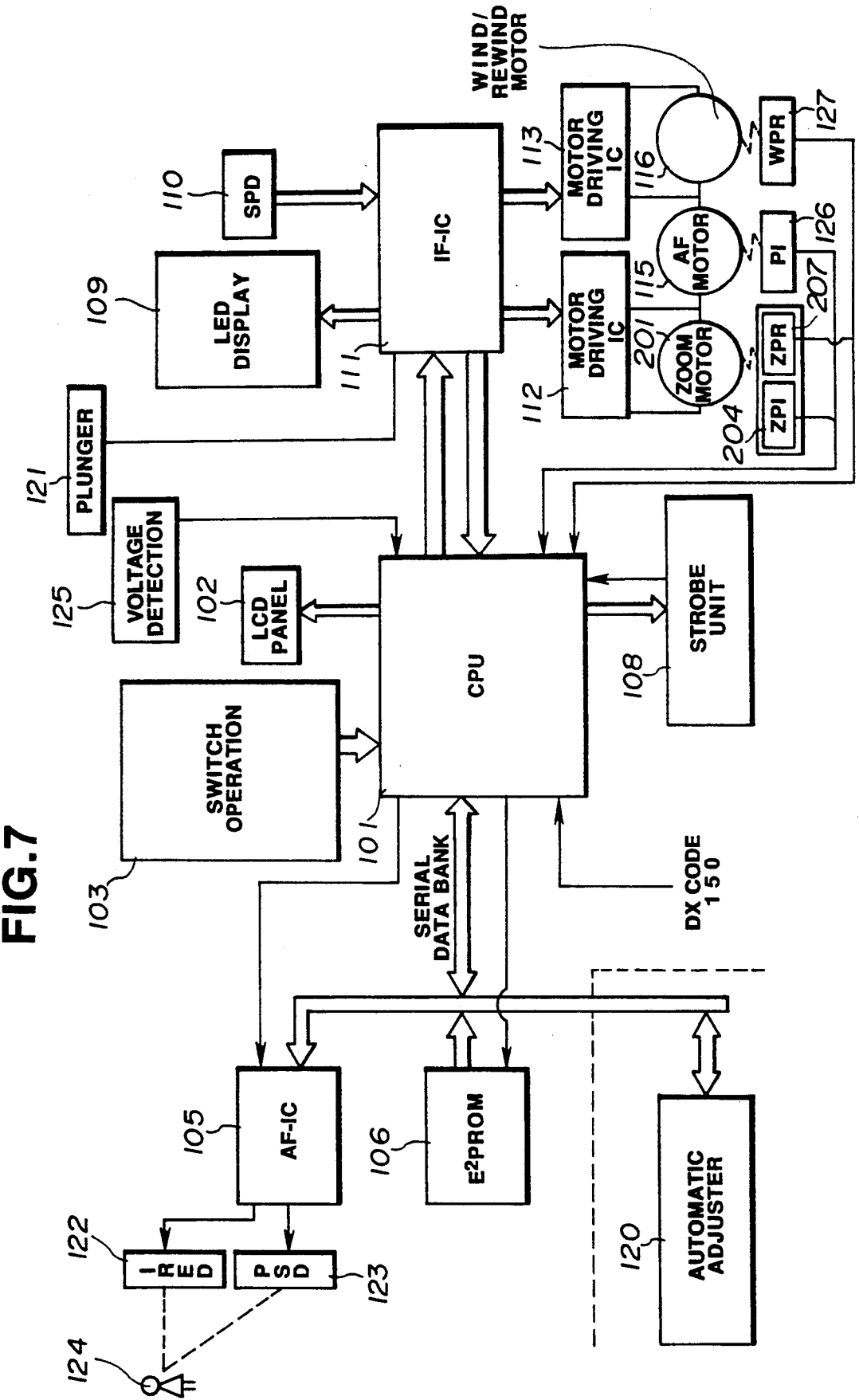
FIG. 7 is a block diagram of principal electrical circuits in the encoder device of the first embodiment.

FIG. 7 is a block diagram of the zoom camera to which the first embodiment is applied.

In FIG. 7, the CPU 101 comprises a microcomputer for controlling the entire operation of the zoom camera by executing sequence control in operation of the zoom camera, calculations for auto-focusing/auto-exposure (hereinafter referred to as AF/AE), A/D conversion, control of LCD/LED, and switch input control.

An LCD panel 102 is a liquid crystal display board for indicating the number of frames of a film, the result of battery check, and so forth.

A switch operation unit 103 includes such control switches as a first stage switch 1R operated for locking AF and AE when a release button is half depressed, a second stage switch 2R operated for releasing a shutter when the release button is fully depressed, a switch ZOOMUP for zoom-up, a switch ZOOMDOWN for zoom-down, a power switch POWER for, when turned on, causing the CPU 101 to give indications on the LCD panel 102 and bring the entire zoom camera into a state capable of taking a photo, a forced rewind switch RW for rewinding the film during the photographing, and a back lid opening/-closing switch BK for detecting the back lid being closed to perform idle feeding.

Further, in FIG. 7, denoted by reference numeral 105 is an IC for AF photometry (AF-IC), a light emitting diode (IRED 122), 123 is a position sensor (PSD), and 124 is an object to be photographed. The AF-IC 105 causes IRED 122 to emit an infrared ray to the object 124 in response to a control signal from the CPU 101, and the reflected light is detected by the PSD 123 for making photometry to measure the distance to the object. The measured distance data is transferred to the CPU 101 via a serial data bus.

An EEPROM 106 is an electrically erasable ROM and stores therein the number of frames of a film and other various adjustment values such as exposure correction values, strobe charge voltage information, and battery check information.

A strobe unit 108 starts charging when a charge signal is applied from the CPU 101. The charged voltage is transmitted to the CPU 101 where, after A/D conversion, it is compared with the charge voltage information in the EPROM 106 for checking whether the charging has been completed or not.

An LED display 109 provides indications for informing a user or photographer of strobe flash alarm, AF locking, and so forth.

An IF-IC 111 is an interface IC comprising an LED driving circuit, a circuit for making photometry with the aid of an SPD 110, a motor driving circuit, a reference voltage circuit, and so forth.

Denoted by 112, 113 are both motor driving IC's. A motor drive signal delivered from the CPU 101 is once decoded in the IF-IC 111 and then supplied to the motor driving IC's 112, 113. In response to the signal from the CPU 101, any of the aforesaid zoom motor 201, an AF motor 115 and a wind/rewind motor 116 is selected and driven.

A photo-interrupter 126 for producing an output signal with rotation of the AF motor 115 is provided near the AF motor 115, and the CPU 101 controls rotation of the AF motor 115 based on an output of the photo-interrupter 126.

Similarly, a photo-interrupter 127 for producing an output signal with rotation of the wind/rewind motor 116 is provided near the wind/rewind motor 116, and the CPU 101 controls rotation of the wind/rewind motor 116 based on an output of the photo-interrupter 127.

The zoom motor 201 is controlled, as stated before, by the CPU 101 based on the output signals of the fine signal interrupter 204 and the coarse signal interrupter 207.

An automatic adjuster 120 is used as a checker with which adjustments for AF, AE, battery check, strobe, etc. are made in the factory. These data are transmitted to the CPU 101 via the serial data bus so that adjustment values are stored in the EEPROM 106.

A DX code 150 of the film is directly read into the CPU 101 and used in calculations to determine an exposure value.

Denoted by 121 is a plunger for opening and closing a sector, and 125 is a unit for detecting battery voltage to reset the CPU 101 when a fresh battery is set or the voltage is restored.

Operation of the lens barrel to which the first embodiment is applied will be explained below.

First, when the zoom motor 201 in the encoder device 200 is rotated and the output gear 205 held in mesh with the drive gear 21 is also rotated correspondingly, the drive cylinder 20 is caused to rotate in the direction A or B (see FIGS. 2 and 6). Assuming now that the drive cylinder 20 is rotated in the direction A from the sunk state, the cam cylinder 30 is moved in the direction C of the optical axis (see FIG. 2), while rotating in the direction A, in accordance with the relationship between the elongate guide slots 20a and the cam slots 10a. At this time, the float key 80, which is free to rotate with respect to the cam cylinder 30 but integral therewith in the direction of the optical axis, is not allowed to rotate because of the guide projections 80a being fitted in the straightforward grooves 10b, and hence moved straight in the direction C of the optical axis. Since the first lens cylinder 40, the second lens cylinder 50 and the third lens cylinder 60 are arranged to be not rotatable with respect to the float key 80, as explained above, the first lens cylinder 40, the second lens cylinder 50 and the third lens cylinder 60 are only moved straight without rotating.

Figure 4:
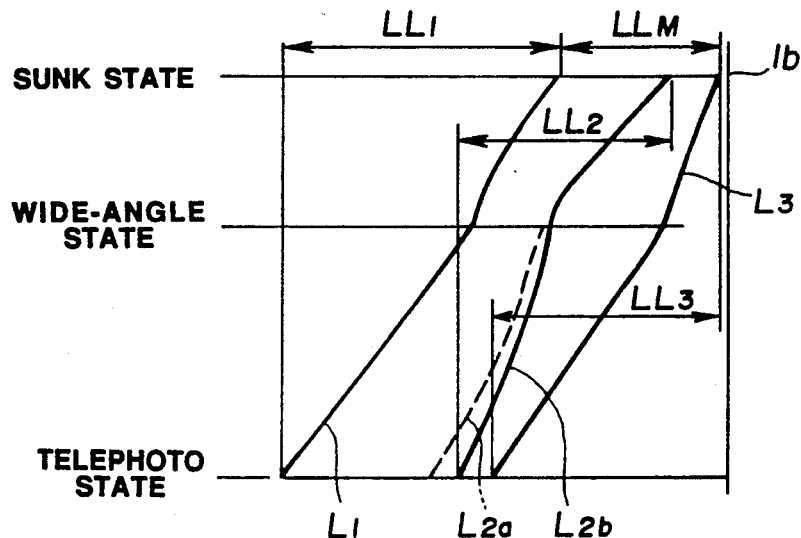
FIG. 4 is a diagram showing the maximum amounts of movement of respective lens group in the zoom camera of FIG. 1.

The cam grooves formed in the cam cylinder 30 comprise, as explained above, the cam groove 30a for the first lens group, the cam groove 30b for the second lens group, and the cam groove 30c for the third lens group. Maximum amounts of movement LL1, LL2, LL3 of the respective lens groups resulted from the relationship between the cam grooves 30a, 30b, 30c and the cam slots 10a are shown in FIG. 4. The maximum amounts of movement LL1, LL2, LL3 respectively indicate maximum amounts of movement of the first lens group L1, the second lens group L2 and the third lens group L3. Also, reference characters L1, L2a, L2b, L3 in FIG. 4 indicate respective paths of movement of the lens groups. Thus, L1 indicates a path of the first lens group, L2a, L2b paths of the second lens group in proximate and infinite conditions, and L3 a path of the third lens group. Additionally, 1b denotes a film plane and LLM represents a minimum length from the lens support frame 41 to the drive rollers 60a.

Taking the float key 80 as a reference, the cam cylinder 30 is only rotated and, therefore, the lens groups are moved upon rotation of the cam cylinder 30 from the sunk state toward the telephoto state following the paths shown in FIG. 4.

On the other hand, when the zoom motor 201 is rotated in a reversed direction, the drive cylinder 20 rotates in the direction B (see FIGS. 2 and 6) and, as a result, the lens groups are moved from the telephoto state toward the sunk state conversely following the paths shown in FIG. 4.

The cut-out 20b formed in the drive cylinder 20 comes into engagement with the stop projection 10d provided on the stationary cylinder 10 for restricting rotation of the drive cylinder 20, when the drive cylinder 20 goes on to rotate toward the sunk side in excess of the sunk state and when it goes on to rotate toward the telephoto side in excess of the telephoto state.

Operation of the zoom camera to which the first embodiment is applied will be explained below with reference to flowcharts shown in FIGS. 8 to 10.

Figure 8:
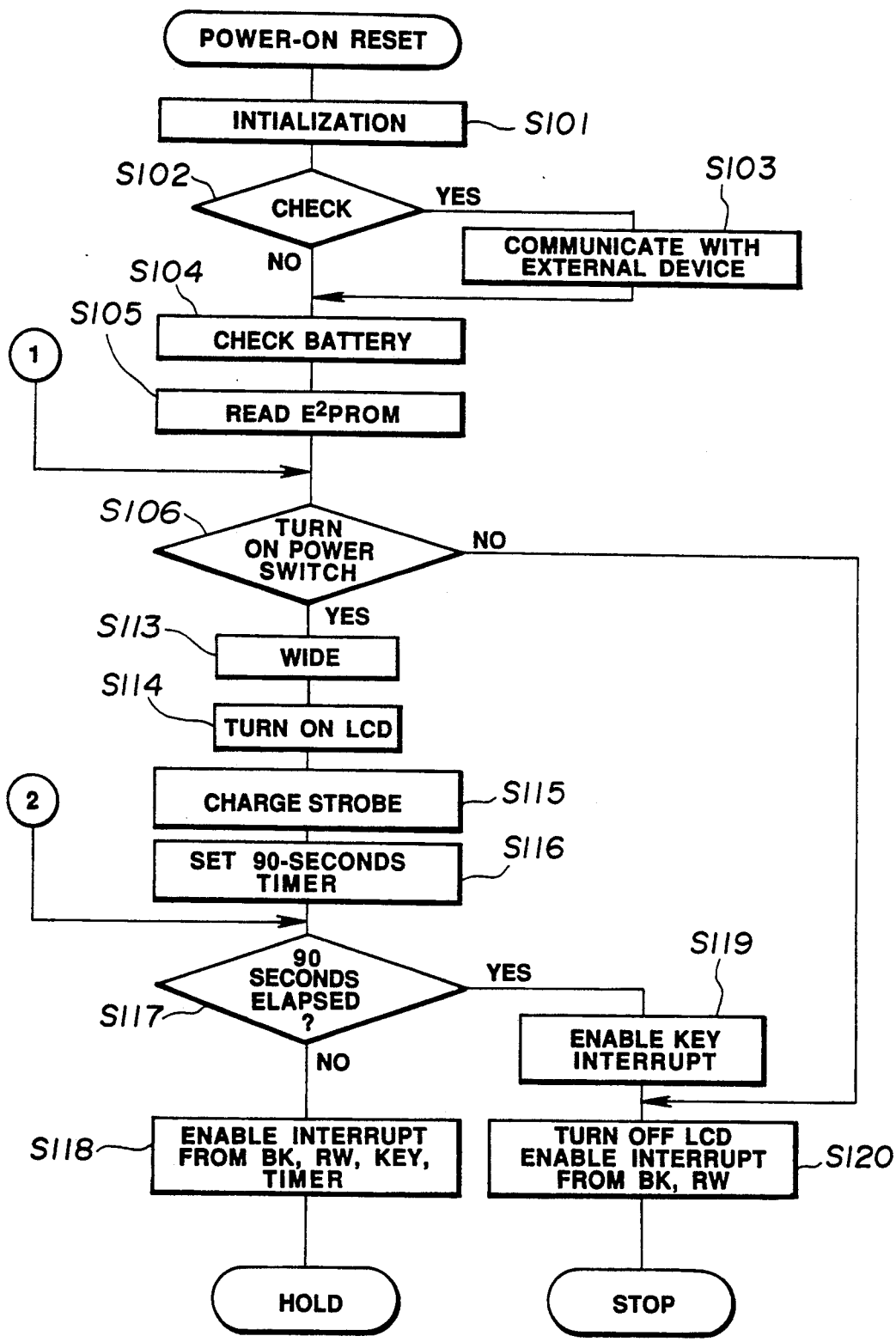
FIG. 8 is a flowchart showing a subroutine for power-on reset executed upon turning-on of power to the zoom camera to which the first embodiment is applied.
Figure 9:
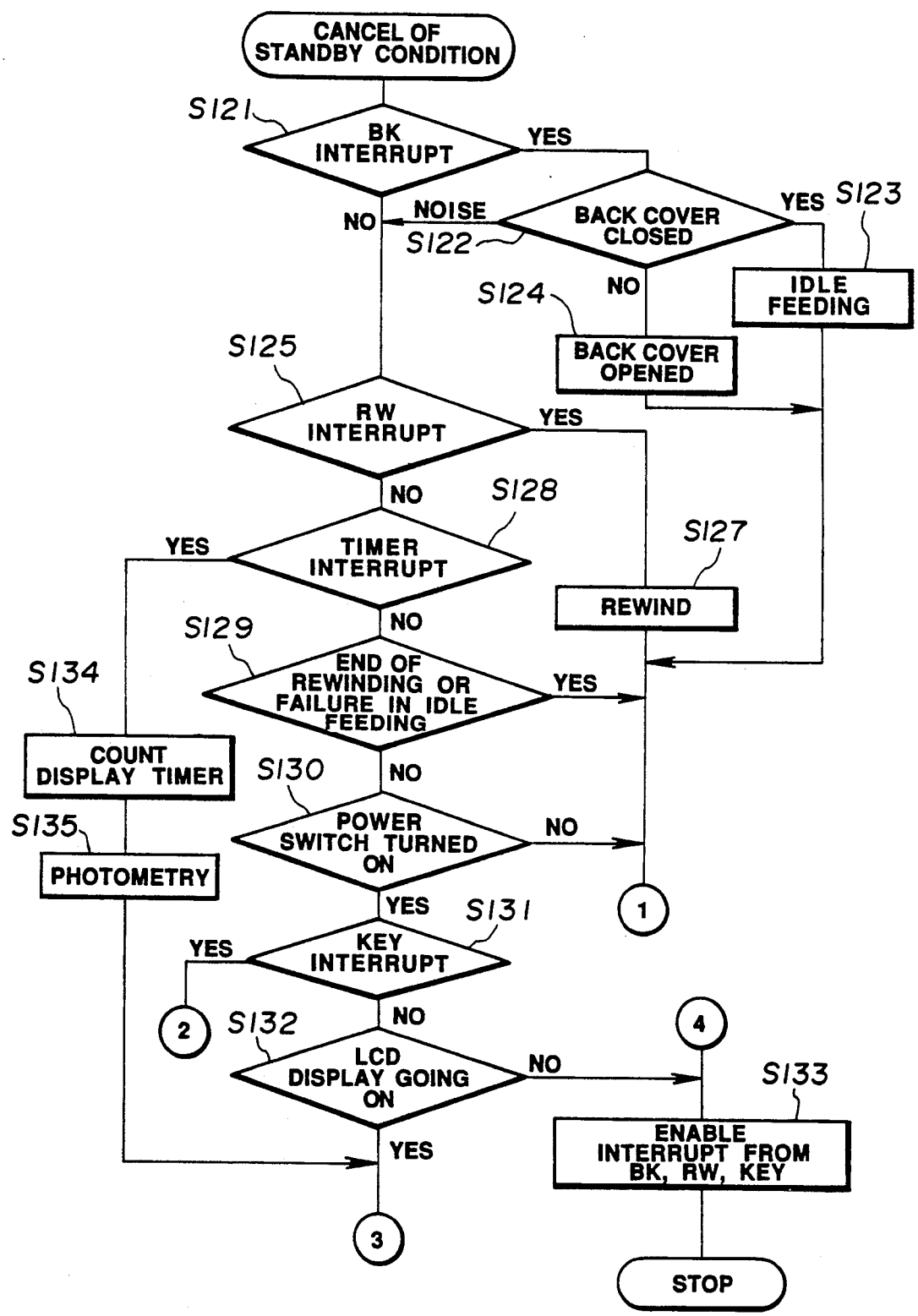
FIG. 9 is a flowchart showing a subroutine for cancelling of a standby condition in the zoom camera to which the first embodiment is applied.

FIG. 8 is a flowchart showing a subroutine for power-on reset executed upon turning-on of power to the zoom camera.

In FIG. 8, when a battery is inserted and/or the power switch POWER is turned on, the CPU 101 is subjected to power-on reset to start operation of the camera. When the subroutine for power-on reset is called, respective ports and a RAM in the CPU 101 are first initialized in step S101. Thereafter, it is checked in step S102 whether the automatic adjuster 120 is connected to the CPU 101 or not. If the automatic adjuster 120 is connected to the CPU 101 as a result of the check, then the control flow proceeds to step S103 for communicating with an external device. If the automatic adjuster 120 is not connected to the CPU 101, then the control flow immediately proceeds to step S104 for checking the battery. If the battery voltage is not sufficient, then the CPU provides an indication of "no battery" on the LCD panel 102 and inhibits all operations of the camera.

After reading predetermined data from the EEPROM 106 in step S105, the power switch POWER is checked in step S106. If the power switch POWER is turned off, then the control flow proceeds to step S120 where the display on the LCD panel 102 is erased and interrupts from the switch BK for opening/closing the back lid and the switch RW for rewinding the film forcibly are enabled, followed by coming into a stop mode. If the power switch POWER is turned on in above step S106, then the control flow proceeds to step S113 where the zoom lens is moved from the sunk position to the wide-angle end position capable of taking a photo. The control flow further proceeds to step S114 where predetermined information is displayed on the LCD panel 102, and then to step S115 where the strobe is charged into a photographing enable condition.

In step S116, display time on the LCD panel 102 is set to 90 seconds, for example. If the user operates any step during the set time, then a 90-second timer is set again. The control flow proceeds to step S117 where it is checked whether 90 seconds has elapsed or not. If 90 seconds has elapsed, then the control flow proceeds to step S119. If 90 seconds has not elapsed, then the control flow proceeds to step S118 where interrupts from the back lid opening/closing switch BK, the forced rewind switch RW and other control switches (hereinafter referred to as KEY) are enabled, followed by coming into a halt mode. When any interrupt enable switch is depressed in the stop mode or the halt mode, a subroutine for cancel of standby condition shown in FIG. 9 is executed.

The subroutine for cancel of standby condition will now be explained with reference to a flowchart shown in FIG. 9.

First, it is checked in step S121 whether there is an interrupt from the back lid switch BK. If there is an interrupt from the back lid switch BK, then the control flow proceeds to step S122 to determine whether the back lid is closed or not. If the back lid is not closed in step S122, then the control flow proceeds to step S124 where the back lid is opened, followed by returning to ① in FIG. 8. If the back lid is closed, then the control flow proceeds to step S123 where idle feeding is performed, followed by returning to ①.

In step S125, an interrupt from the rewind switch RW is checked. If there is an interrupt from the rewind switch RW, then the control flow proceeds to step S127 where the film is rewound.

In step S128, a timer interrupt is checked. If there is a timer interrupt, then the control flow proceeds to step S134 where counting of the display timer is restarted and, subsequently, to a step S135 where photometry is performed, followed by returning to ② in FIG. 8. If there is no timer interrupt in above step S128, then the control flow proceeds to step S129 to check the end of film rewinding or a failure of the idle feeding. If either the end of film rewinding or a failure of the idle feeding is found, then the control flow returns to ① in FIG. 8 so that the camera will not operate. If neither the end of film rewinding nor a failure of the idle feeding is found, then the control flow proceeds to step S130. In step S130, the condition of the power switch POWER is checked. If the power switch turned off, then the control flow returns to ① and, if turned on, it further proceeds to step S131 along the main flow.

In step S131, it is determined whether there is a KEY interrupt or not. If an interrupt is generated upon any of mode switches described later being depressed, then the control flow skips to ② in FIG. 10. If no interrupt is generated, then the control flow proceeds to step S132.

In step S132, it is checked whether any information is being displayed on the LCD panel 102. If no information is being displayed, then the control flow proceeds to step S133 where the KEY interrupt from the control switches such as BK and RW are enabled, followed by coming into a stop mode. If the LCD panel 102 is displaying information in above step S132, then the control flow returns to ② in FIG. 8.

Note that KEY in steps S117, S131 and S133 implies any one of control switches in the switch operation unit 103 shown in FIG. 7.

A subroutine for process of the KEY interrupt will now be explained with reference to FIG. 10.

Figure 10:
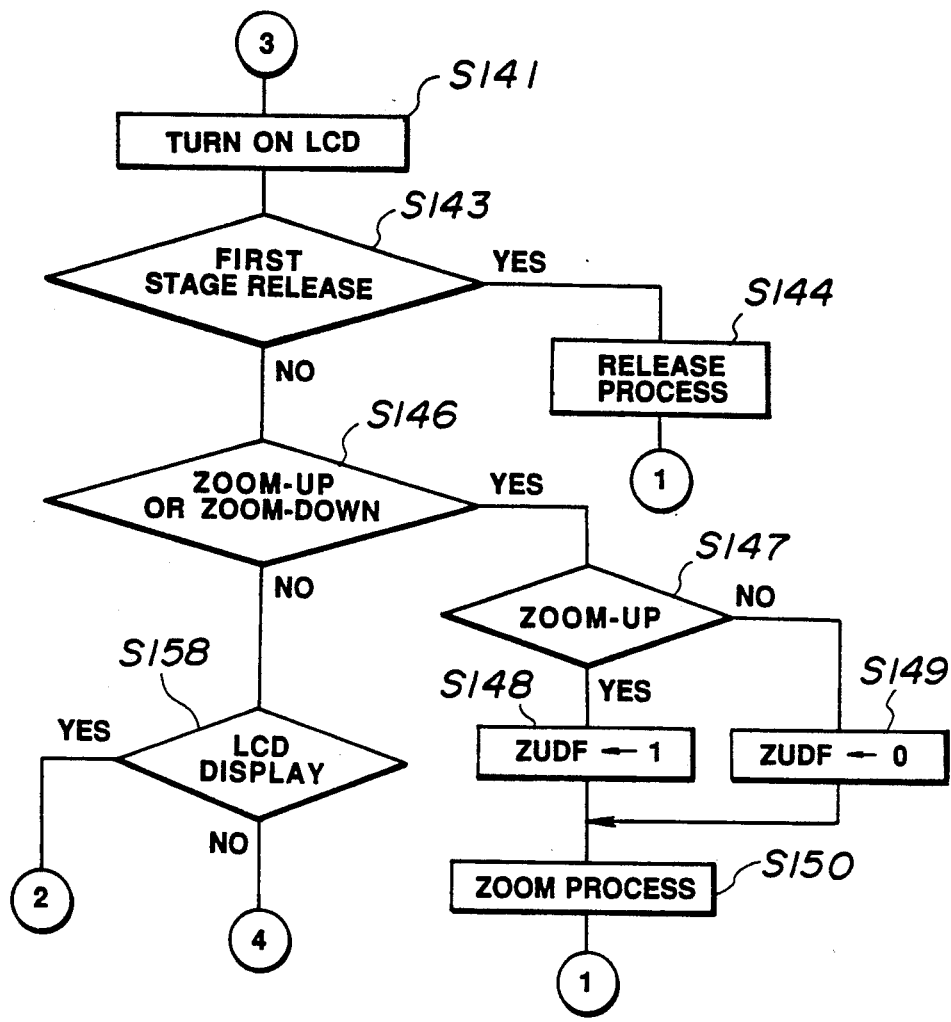
FIG. 10 is a flowchart showing a subroutine for an interrupt process by switch operation in the zoom camera to which the first embodiment is applied.

If there is any KEY interrupt in above step S131 (FIG. 9), then the control flow proceeds to step S141 in FIG. 10 where the LCD panel 102 (see FIG. 7) is turned on. After that, the control flow proceeds to step S143 to check whether the first-stage release switch 1R is depressed or not. If the first-stage release switch 1R is depressed, then the control flow proceeds to step S144 where release process is executed, followed by returning to ① in FIG. 8. If the first-stage release switch 1R is turned off, then the control flow proceeds to step S146. If neither zoom-up nor zoom-down is instructed in step S146, then the control flow further proceeds to step S158. This step S158 checks whether the LCD panel 102 is displaying information or not. If any display is going on, then the control flow returns to ② in FIG. 8 and, if no display is being made, then it returns to ④ in FIG. 9.

If either zoom-up or zoom-down is instructed in above step S146, then the control flow proceeds to step S147. If zoom-up is instructed, then flag ZUDF=1 is set (step S148) and, if zoom-down is instructed, then flag ZUDF=0 is set (step S149), followed by zoom process in step S150.

The zoom process in step S150 will now be explained in detail.

First, the CPU 101 (see FIG. 7) drives the zoom motor 201 (see FIG. 6) to rotate the drive cylinder 20 in the sinking direction farther beyond the sunk position. The drive cylinder 20 soon stops the rotation upon one edge of its cut-out 20b engaging the stop projection 10d provided on the stationary cylinder 10. At this time, the CPU 101 resets a coarse counter for counting an output signal (coarse pulse) from the coarse signal photo-interrupter 207 (see FIG. 7). Then, the CPU 101 now drives the zoom motor 201 in the reverse direction to rotate the drive cylinder 20 toward the telephoto side, while continuing to count the coarse pulses. Note that each coarse pulse is counted at its rising edge.

In a short time, the drive cylinder 20 steps the rotation upon the other edge of its cut-out 20b engaging the stop projection 10d and, simultaneously, the coarse signal photo-interrupter 207 also stops producing the output signal.

Here, because the sunk position, the wide-angle end position and the telephoto end position of the zoom lens correspond to respective angles of rotation determined by mechanisms in the zoom lens drive unit, the CPU 101 executes calculations below for storing respective count values of the coarse pulses at the sunk position, the wide-angle end position and the telephoto end position. In other words, the values represented by;

sunk pulse number = sunk position angle / total rotating angle × total coarse pulse count number = P1 wide-angle pulse number = wide-angle position angle / total rotating angle × total coarse pulse count number = P2 telephoto pulse number = telephoto position angle / total rotating angle × total coarse pulse count number = P3 are stored in the EEPROM 106.

The above represents a method of adjusting the pulse number corresponding to the wide-angle end position and the telephoto end position. That adjustment is performed during the production process in the factory, and the adjusted values are stored in the EEPROM 106 from the automatic adjuster 120.

Figure 11:
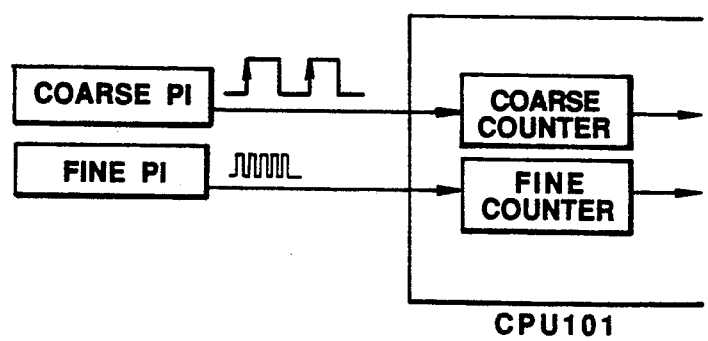
FIG. 11 is a diagram showing a photo-interrupter (PI) for coarse signal, a photo-interrupter for fine signal, and counters in a CPU corresponding to these photo-interrupters in the first embodiment.
Figure 14:
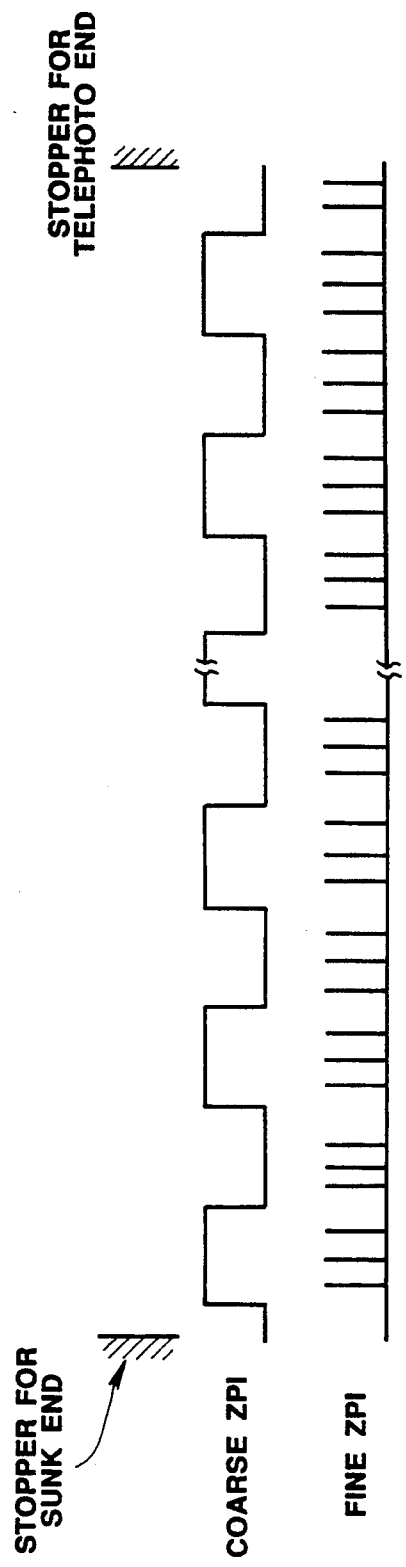
FIG. 14 is a timing chart showing output signals of the photo-interrupters employed in the first embodiment.

FIG. 11 is a diagram showing the coarse signal photo-interrupter 207, the fine signal photo-interrupter 204, and counters in the CPU 101 corresponding to these photo-interrupters. FIG. 14 is a timing chart showing output signals of both the photo-interrupters.

The foregoing zoom lens position control will now be explained in more detail. First, when a battery is loaded into the zoom camera, the CPU 101 rotates the drive cylinder 20 in the sinking direction farther beyond the sunk position until the rotation of the drive cylinder 20 is stopped upon engaging the stop projection 10d and, at the same time as stop of the drive cylinder, the coarse counter is reset. Then, the drive cylinder 20 is rotated toward the telephoto side while continuing to count the coarse pulses. When the count value reaches the above count number P1, this is judged as corresponding to the sunk position and the zoom motor 201 is stopped to cease driving of the drive cylinder 20. If the power switch POWER is turned on, the zoom motor 201 is further rotated and then stopped when the coarse pulse number reaches P2. Through the above process, the zoom lens is moved to the wide-angle end position.

Now, when a zoom button T is depressed, the CPU 101 drives the zoom motor 201 while adding the coarse pulses and, when a zoom button W is depressed, it drives the zoom motor 201 while subtracting the coarse pulses. At the time the coarse pulse number reaches P1 or P3, the CPU 101 inhibits further driving of the zoom motor 201. If the zoom button is released during the driving of the zoom motor 201, the CPU 101 brakes the zoom motor 201 at the rising edge of the next coarse pulse. Since the zoom motor 201 cannot stop at once after applying the brake, the fine counter (see FIG. 11) starts counting fine pulses after that. When the zoom motor 201 is completely stopped, no further fine pulses are produced.

In other words, the fine counter counts the fine pulses produced between the coarse pulses, thus making it possible to detect the stop position of the zoom lens with higher accuracy.

Since the number of fine pulses produced between two coarse pulses is determined depending on the gear ratio, the CPU 101 can compute the zoom lens position from the following formula on an assumption that the number of fine pulses produced between two coarse pulses is k. The zoom encoder value is given by:

zoom encoder value = (coarse pulse number × k) + fine pulse number

Incidentally, there is no fear of false count because the coarse pulses can be set to be sufficiently low relative to a control rate of the CPU 101.

While the coarse count is reset upon engaging the stopper projection 10d, the present invention is not limited to such a resetting scheme. As an alternative, for example, the coarse counter may be controlled by providing a switch for detecting the wide-angle end position.

Thus, owing to the fact that the stop position of the zoom lens is detected by utilizing the fine pulses, the stop position can be detected with high accuracy wherever the zoom lens is stopped after applying the brake.

The foregoing operation will now be explained with reference to flowcharts of FIGS. 15 to 18 and timing charts of FIGS. 12 and 13. Incidentally, this operation corresponds to above step S147 in FIG. 10.

Figure 12:
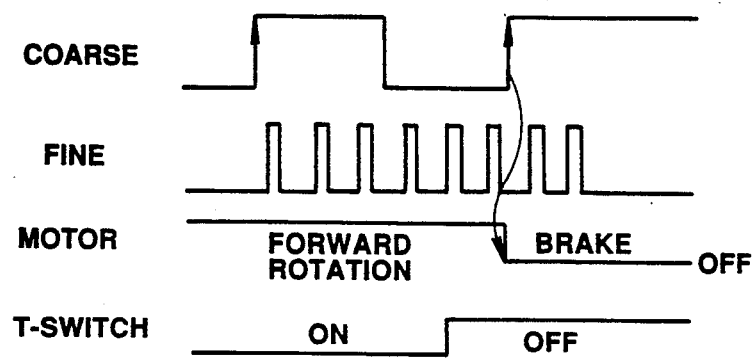
FIG. 12 is a timing chart showing the relationship among coarse pulses, fine pulses, a zoom motor and a zoom button T in the first embodiment when a zoom lens is moved in the direction from a telephoto end position to a wide-angle end position.

FIG. 12 is a timing chart showing the relationship among the coarse pulses, the fine pulses, the zoom motor 201 and the zoom button T when the zoom lens is moved in the direction from the telephoto end position to the wide-angle end position.

Figure 13:
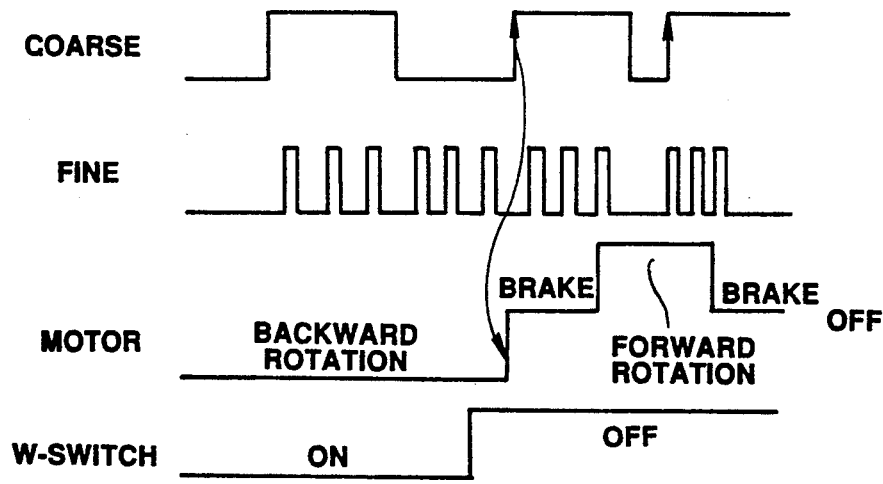
FIG. 13 is a timing chart showing the relationship among the coarse pulses, the fine pulses, the zoom motor and a zoom button W in the first embodiment when the zoom lens is moved in the direction from the wide-angle end position to the telephoto end position.

FIG. 13 is a timing chart showing the relationship among the coarse pulses, the fine pulses, the zoom motor 201 and the zoom button W when the zoom lens is moved in the direction from the wide-angle end position to the telephoto end position, FIG. 13 showing a manner in which the zoom lens is moved toward the telephoto end side for eliminating backlash.

Figure 15:
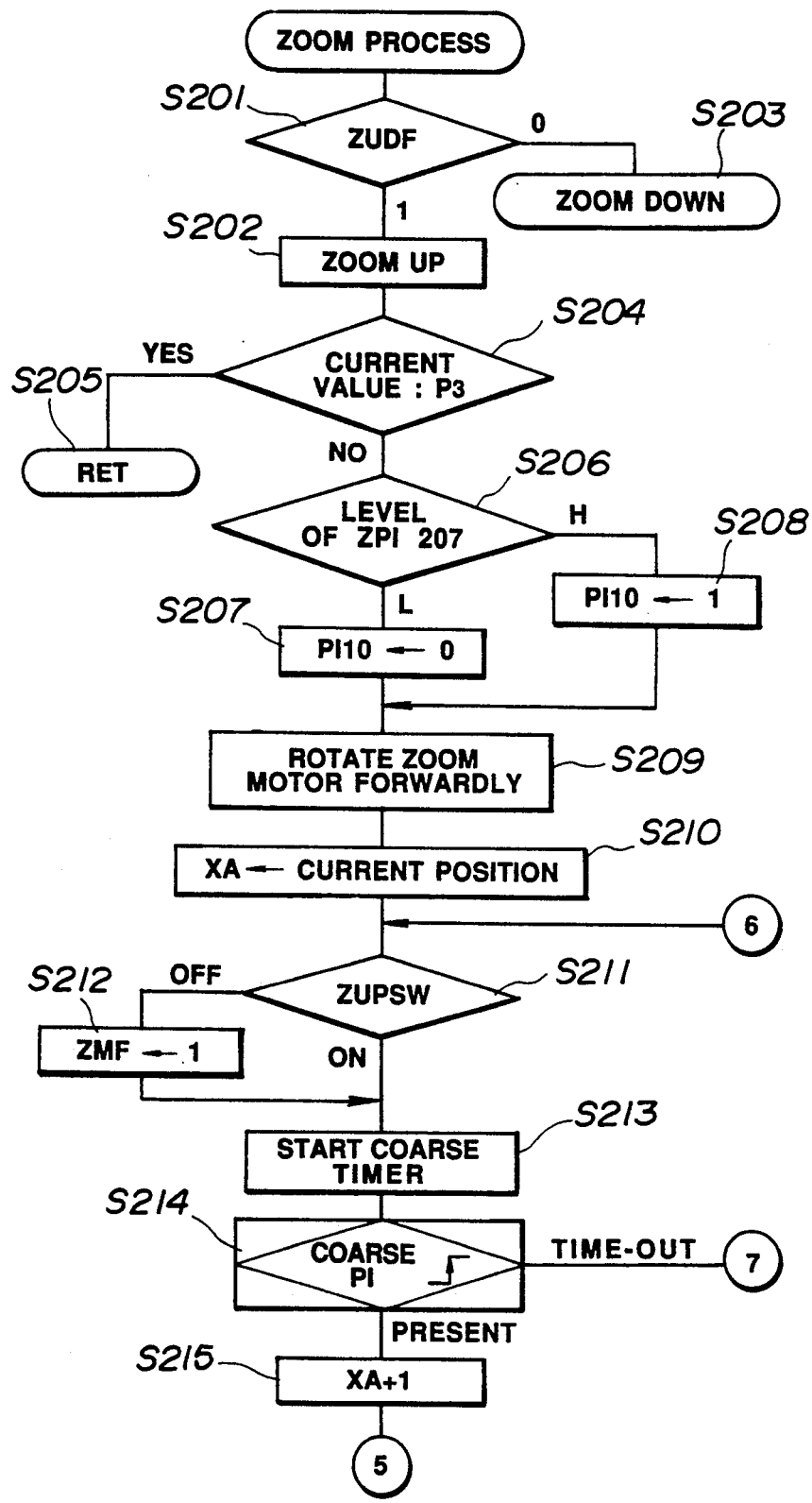
FIG. 15 is a flowchart showing a subroutine for a zoom processin the first embodiment.

Referring to the flowchart of FIG. 15, the CPU 101 first checks the flag ZUDF, following which the control flow proceeds to ZOOM UP in step S202 if ZUDF=1 and to ZOOM DOWN in step S203 if ZUDF=0. After proceeding to ZOOM UP in step S202, it is checked in step S204 whether the current value of the coarse counter using the coarse signal photo-interrupter 207 is equal or not to the count number P3 representing the telephoto end position. If YES, then the control flow proceeds to step S205 for returning to the main routine.

If NO in above step S204, then the level of the coarse signal photo-interrupter 207 is checked in step S206. If it is at an "L" level, then the control flow proceeds to step S207 where a flag PI10 is set to 0, followed by going to step S209. If it is at an "H" level in step S206, then the control flow proceeds to step S208 where the flag PI10 is set to 1, followed by going to step S209. Note that the flag PI10 is used for edge detection of the coarse pulse from the coarse signal photo-interrupter 207.

In step S209, the zoom motor 201 is rotated forwardly and, in next step S210, the current count value of the coarse counter is put into an XA register. Thereafter, a zoom-up switch ZUPSW is checked in step S211. If the zoom-up switch ZUPSW is turned off, then a flag ZMF is set to 1 in step S212. Incidentally, ZMF=0 is set at the beginning of the flow. If the zoom-up switch ZUPSW is turned on in above step S211, then a timer for edge detection of the coarse pulse is started in step S213 and the rising edge of the coarse pulse is detected in step S214 by using the flag PI10. If the rising pulse edge is detected, then the control flow proceeds to step S215 where the XA register is incremented by +1, followed by going to ⑤ in FIG. 16. If no rising pulse edge is detected within a predetermined period of time, then the control flow proceeds to ⑦ in FIG. 16.

Figure 16:
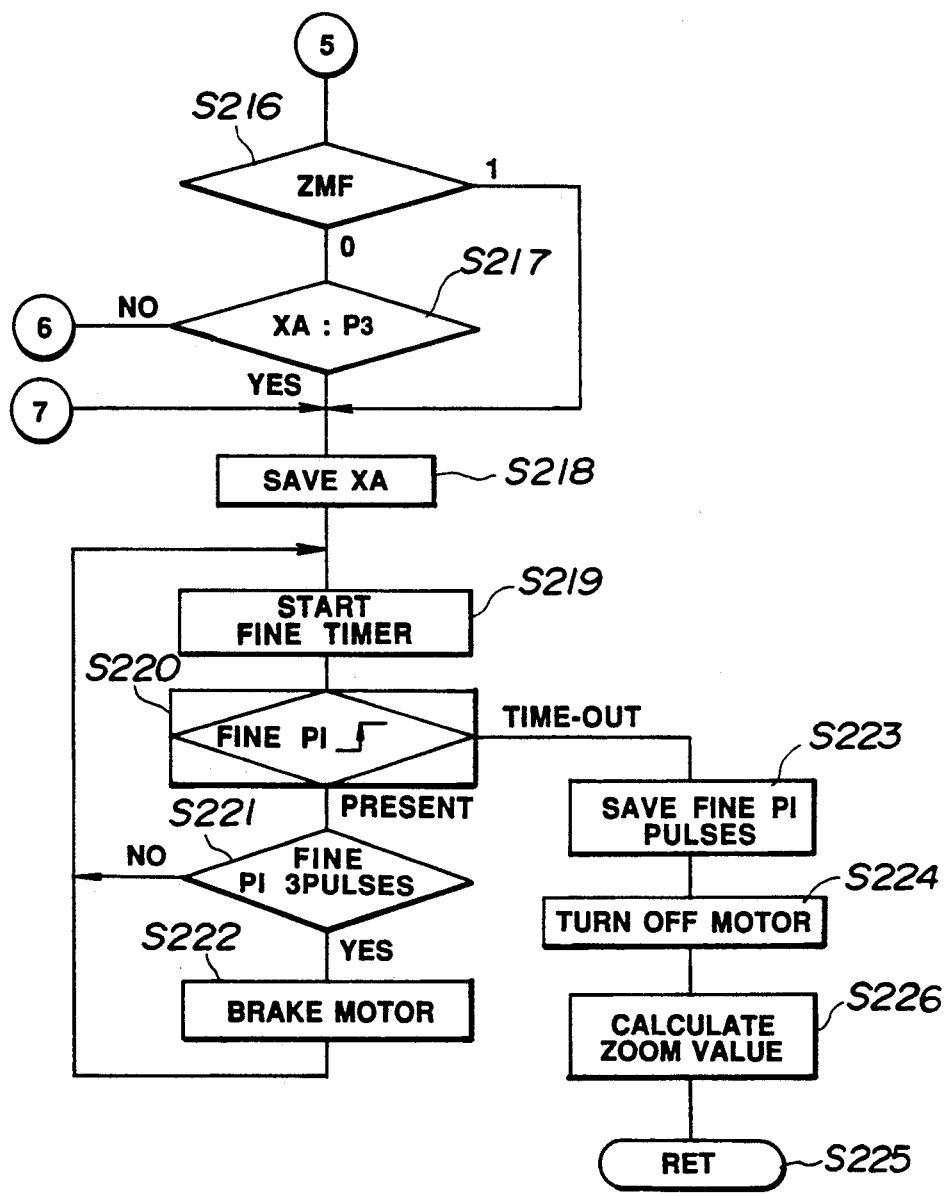
FIG. 16 is a flowchart showing a subroutine for a zoom process in the first embodiment and which is combined with the flowchart of FIG. 15.

The flag ZMF is checked in step S216 in FIG. 16. If ZMF=1, then the control flow proceeds to step S218 because the ZUPSW is turned off. If ZMF=0 in step S216, then the control flow proceeds to step S217 because the ZUPSW is turned on.

It is checked in step S217 whether the value of the XA register is equal to P3 or not. If it is not equal to P3, then the control flow returns to ⑥ in FIG. 15 for checking the ZUPSW again in S211. If it is equal to P3, then the control flow proceeds to step S218.

Since the current count value of the coarse counter is put in the XA register, it is saved in step S218 and, thereafter, a timer for counting by the fine counter is started in step S219. Next step S220 checks whether there is a rising edge of the fine pulse from the fine signal photo-interrupter 204. If the rising edge of the fine pulse is present, then the control flow proceeds to step S221.

A loop is formed between steps S221 and S219 until three fine pulses are confirmed. If three fine pulses are not confirmed within a predetermined period of time, then the control flow proceeds to step S223 in response to time-out. On the other hand, if three fine pulses are confirmed within the predetermined period of time, then the control flow proceeds to step S222.

The zoom motor 201 is braked in step S222, followed by returning to step S219.

In step S223, the count value of the fine counter is saved in response to the time-out. Thereafter, the zoom motor 201 is turned off in step S224 and the zoom value is calculated in step S226, followed by returning to the main routine in step S225.

As mentioned before, if flag ZUDF=0 in step S201, then the control flow proceeds to ZOOM DOWN in step S203. Operation in this ZOOM DOWN mode will now be explained with reference to flowcharts subsequent to step S301 in FIG. 17.

Figure 17:
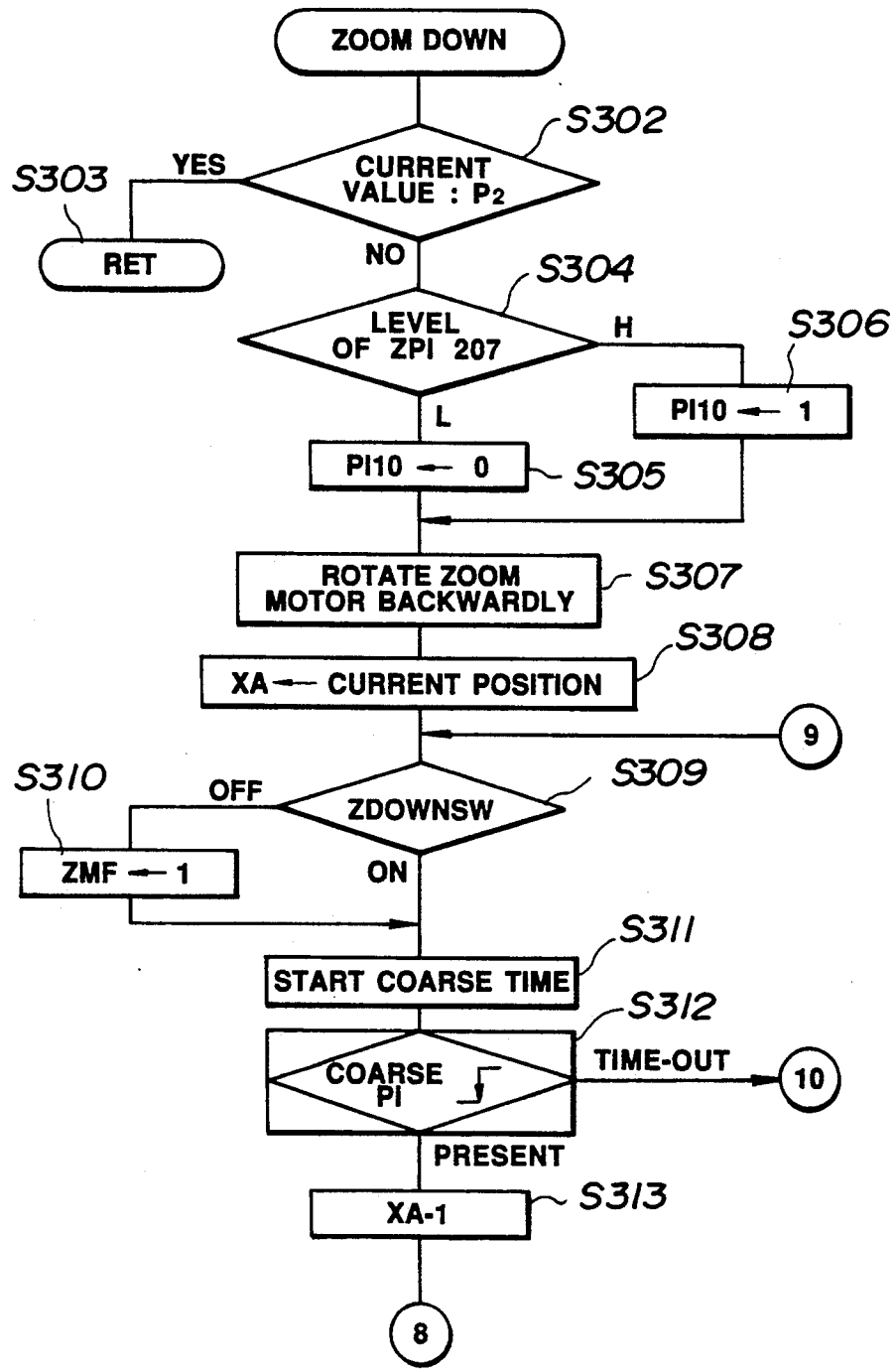
FIG. 17 is a flowchart showing a subroutine for zoom-down during a zoom process in the first embodiment.

In step S302 of FIG. 17, it is checked whether the current value of the coarse counter using the coarse signal photo-interrupter 207 is equal or not to the count number P2 representing the wide-angle end position. If YES, then the control flow proceeds to step S303 for returning to the main routine.

If NO in above step S302, then the level of the coarse signal photo-interrupter 207 is checked in step S304. If it is at an "L" level, then the control flow proceeds to step S305 where the flag P110 is set to 0, followed by going to step S307. If it is at an "H" level in step S304, then the control flow proceeds to step S306 where the flag P110 is set to 1, followed by going to step S307. Note that the flag P110 is used for edge detection of the coarse pulse from the coarse signal photo-interrupter 207.

In step S307, the zoom motor 201 is rotated backwardly and, in the next step S308, the current count value of the coarse counter is put into the XA register. Thereafter, a zoom-down switch ZDOWNSW is checked in step S309. If the zoom-down switch ZDOWNSW is turned off, then the flag ZMF is set to 1 in step S310. Incidentally, ZMF=0 is set at the beginning of the flow.

If the zoom-down switch ZDOWNSW is turned on in above step S309, then a timer for edge detection of the coarse pulse is started in step S311 and the falling edge of the coarse pulse is detected in step S312 by using the flag P110. If the falling pulse edge is detected, then the control flow proceeds to step S313 where the XA register is decremented by −1, followed by going to ⑧ in FIG. 18. If no falling pulse edge is detected within a predetermined period of time, then the control flow proceeds to ⑩ in FIG. 18.

Figure 18:
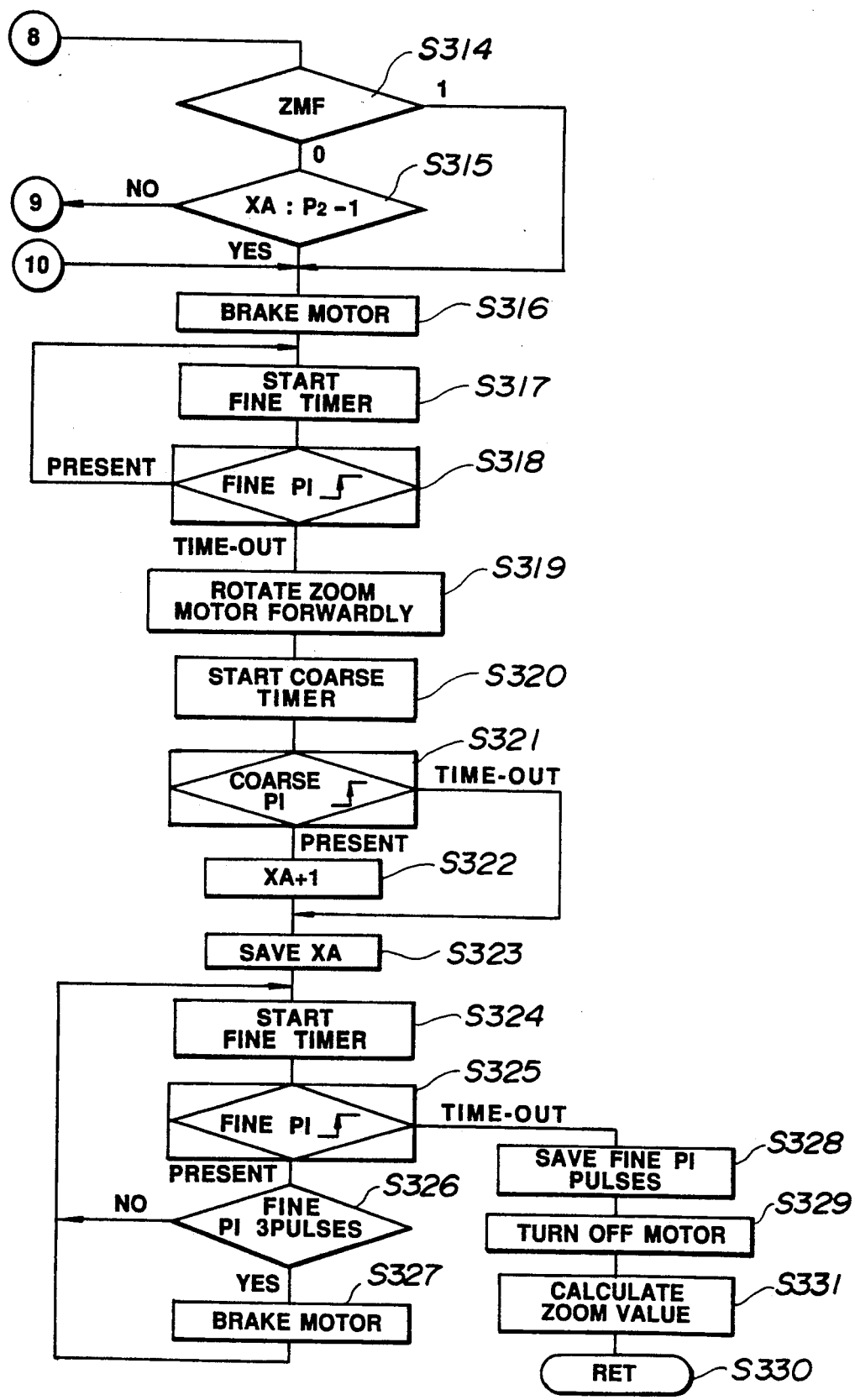
FIG. 18 is a flowchart showing a subroutine for zoom-up during a zoom process in the first embodiment.

The flag ZMF is checked in step S314 in FIG. 18. If ZMF=0, then the control flow proceeds to step S315 because the ZDOWNSW is turned off. If ZMF=1 in step S314, then the control flow proceeds to step S316 because the ZDOWNSW is turned on.

It is checked in step S315 whether the value of the XA register is equal to P2-1 or not. If it is not equal to P2-1, then the control flow returns to ⑨ in FIG. 17 for checking the ZDOWNSW again in S309. If it is equal to P2-1, then the control flow proceeds to step S316.

After braking the zoom motor 201 in step S316, a timer for detecting the rising edge of the fine pulse is started in step S317. Subsequently, step S318 checks the rising edge of the fine pulse. If the rising edge is present, then the control flow returns to step S317, judging that the drive cylinder 20 is still moving. If the rising edge is not confirmed within a predetermined period of time, then the control flow proceeds to step S319 in response to time-out where the zoom motor 201 is rotated forwardly. This forward rotation of the zoom motor 201 is to remove backlash in the reduction gear train 202 and so forth. At this time, it can be judged that the drive cylinder 20 is completely stopped.

In step S320, a timer for detecting the rising edge of the coarse pulse is started. Subsequently, step S321 checks the rising edge of the coarse pulse by using the flag Pl10. If the rising edge is present, then the XA register is incremented by +1 in step S322, followed by proceeding to step S323. If the rising edge is not detected within a predetermined period of time, then the control flow proceeds to step S323 in response to time-out.

Since the current count value of the coarse counter is put in the XA register, it is saved in step S323 and, thereafter, a timer for counting by the fine counter is started in step S324. Next step S325 checks whether there is a rising edge of the fine pulse from the fine signal photo-interrupter 204. If the rising edge of the fine pulse is present, then the control flow proceeds to step S326.

A loop is formed between steps S326 and S324 until three fine pulses are confirmed. If three fine pulses are not confirmed within a predetermined period of time, then the control flow proceeds to step S328 in response to time-out. On the other hand, if three fine pulses are confirmed within the predetermined period of time, then the control flow proceeds to step S327.

The zoom motor 201 is braked in step S327, followed by returning to step S324.

In step S328, the count value of the fine counter is saved in response to the time-out. Thereafter, the zoom motor 201 is turned off in step S329 and the zoom value is calculated in step S331, followed by returning to the main routine in step S330.

With the encoder device thus constructed, since the amount or position of movement of a driven member is detected by using outputs from two pulse generating means, even if backlash is present in a transmission system leading from a drive source to the driven member, the amount or position of movement can be precisely detected without being affected by the backlash.

Also, since counting of the fine pulses from the fine signal photo-interrupter is started after outputting of a stop signal, a memory for the counting requires less capacity than the case of using a single photo-interrupter for control. Still another advantage is in that there occurs almost no false detection due to count error even when driving is repeated.

Figure 19:
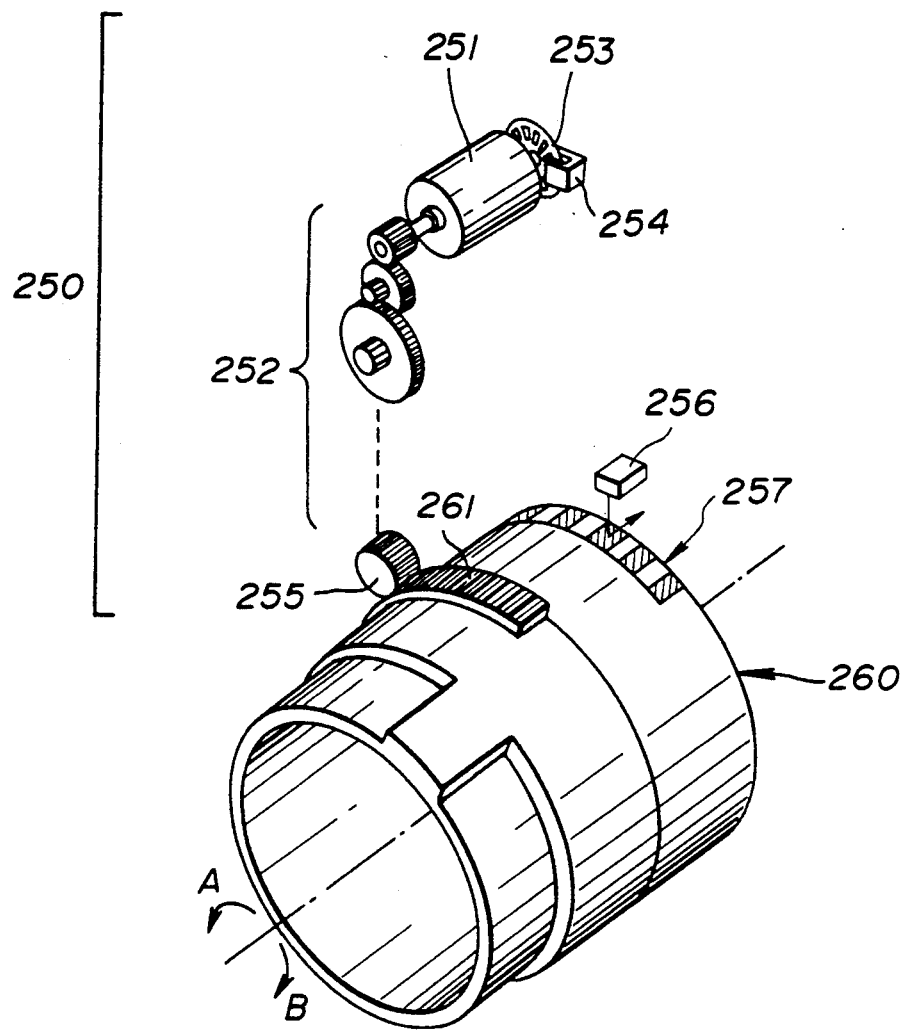
FIG. 19 is a perspective view of a zoom encoder showing a second embodiment of the present invention.
Figure 20:
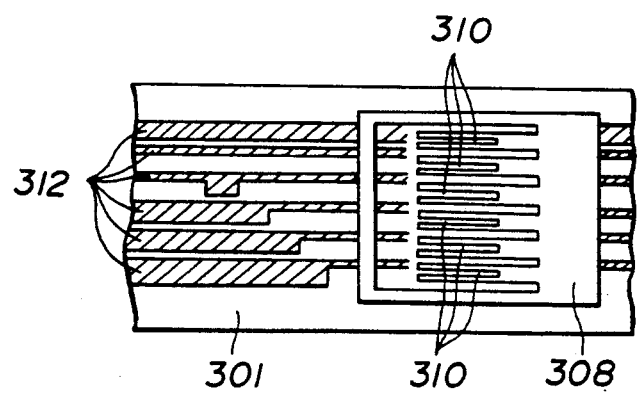
FIG. 20 is a plan view showing a conventional encoder device.

FIG. 19 is a perspective view of an encoder device showing a second embodiment of the present invention.

This second embodiment is arranged similarly to the above first embodiment except that a photo-reflector 256 and a pattern 257 for the photo-reflector are disposed instead of the coarse signal slit 206 and the coarse signal photo-interrupter 207.

The pattern 257 for the photo-reflector is fixedly disposed on an outer circumferential surface of the rear end of a drive cylinder 260 having the same construction as that in the above first embodiment, has a design patterned in a predetermined manner, and is rotated together with the drive cylinder 260. The photo-reflector 256 is disposed within the zoom camera body at a position corresponding to a path of movement of the pattern 257, and produces an output signal variable depending on changes in the patterned design of the pattern 257. The output signal of the photo-reflector 256 is similar to and functions in a like manner to that of the fine signal photo-interrupter 204 in the above first embodiment and, therefore, its explanation is omitted here.

In this invention, it is apparent that working modes different in a wide range can be formed on the basis of this invention without departing from the spirit and scope of the invention. This invention is not restricted by any specific embodiment except as limited by the appended claims.

What is claimed is:

1. An encoder device for a camera comprising:
a zoom lens having a plurality of lens groups,
a drive cylinder for moving a plurality of said lens groups in a predetermined positional relationship,
a motor for rotating said drive cylinder,
a gear train for transmitting a drive force of said motor to said drive cylinder,
first pulse generating means provided on a member which is driven with rotation of said motor after reduction in speed, for generating a coarse pulse signal corresponding to rotation of said motor,
second pulse generating means provided on a member which is driven with rotation of said motor and produces a higher rotational speed than that related to said first pulse generating means, for generating a fine pulse signal corresponding to rotation of said motor,
first count means for counting said coarse pulse signal from a reset position,
second count means for counting said fine pulse signal,
operation means for instructing a zooming direction of said zoom lens,
drive/control means for driving said motor upon start of an operation through said operation means, and stopping driving of said motor upon completion of an operation through said operation means, and
focal length detecting means for determining a focal length of said zoom lens upon completion of driving of said motor based on a number of said coarse pulse signals counted by said first count means and a number of said fine pulse signals counted by said second count means after a final one of said coarse pulse signals has been output.

2. An encoder device for a camera according to claim 1, wherein said first pulse generating means includes:
a coarse signal slitted disk rotating with rotation of a gear in said gear train, and
a photo-interrupter disposed in a path of rotation of said slitted disk for outputting said coarse pulse signal.

3. An encoder device for a camera according to claim 1, wherein said first pulse generating means includes:
a photo-reflector pattern provided on said drive cylinder, and
a photo-reflector for receiving reflected light from said photo-reflector pattern and outputting said coarse pulse signal.

4. An encoder device for a camera according to claim 1, wherein said second pulse generating means includes:
a fine signal slitted disk provided on a rotating shaft of said motor to rotate with rotation of said motor, and
a photo-interrupter disposed in a path of rotation of said slitted disk for outputting said fine pulse signal.

5. An encoder device for a camera according to claim 1, wherein said encoder device further comprises non-volatile storage means for storing a wide-angle pulse number and a telephoto pulse number which are determined based on a total number of coarse pulse signals within a range of zooming operation of said zoom lens, and said drive/control means stops its driving when a count of said first count means reaches at least one of said wide-angle pulse number and said telephoto pulse number.

6. An encoder device for a camera comprising:
a motor for driving a photographing lens,
pulse generating means operated by a drive force transmitted from said motor to said photographing lens, and generating a coarse pulse signal and a fine pulse signal corresponding to rotation of said motor,
count means for counting said coarse pulse signal and said fine pulse signal, respectively,
reset means for resetting the number of said coarse pulse signals counted by said count means when said photographing lens reaches a predetermined position,
motor drive/control means for controlling starting and stopping of said motor, and
detection means for determining a value related to a driven position of said photographing lens upon stopping said motor based on a number of said coarse pulse signals counted from said predetermined position for resetting and a number of said fine pulse signals counted after a final one of said coarse pulse signals has been output.

7. An encoder device for a camera according to claim 6, further comprising operation means for manually instructing a driving direction of said motor, and
edge detecting means for detecting an edge of said coarse pulse signal, wherein:
said motor drive/control means stops said motor in response to said edge signal detected for the first time by said edge detecting means after stop of the manual operation through said operation means.

8. An encoder device for a camera according to claim 6, further comprising operation means for manually instructing a driving direction of said motor, and
edge detecting means for detecting an edge of said coarse pulse signal, wherein:

said motor drive/control means stops said motor after stop of a manual operation through said operation means, and controls said motor such that said motor returns depending on a number of said fine pulse signals counted during a time from a start of a stop operation to a stopped condition.

9. An encoder device for a camera according to claim 6, further comprising operation means for manually instructing a driving direction of said motor, and edge detecting means for detecting an edge of said coarse pulse signal, wherein:

said motor drive/control means stops said motor upon a number of said fine pulse signals reaching a predetermined pulse number when a manual operation through said operation means is stopped at a time of detection of said edge.

10. An encoder device for a camera according to claim 9, wherein said detection means has timer means which starts after stop of said manual operation, and a stop position of said photographing lens is detected by using a number of said fine pulse signals when an elapse of a predetermined period of time is detected by said timer means.

11. An encoder device for a camera comprising:
a motor for driving a photographing lens,
first pulse generating means provided on a side of said photographing lens for generating a first pulse signal depending on movement of said photographing lens side,
first count means for counting said first pulse signal output by said first pulse generating means,
reset means for resetting the count value of said first count means when said photographing lens reaches a predetermined position,
second pulse generating means provided on a side of said motor for generating a second pulse signal depending on movement of said motor side,
second count means for counting said second pulse signal output by said second pulse generating means, and
position detecting means for detecting a rough position of said photographing lens based on a count value of said first count means, and a precise position of said photographing lens based on the count value of said second count means.

12. An encoder device for a camera according to claim 11, further comprising motor drive/control means for controlling starting and stopping of said motor, wherein:

said position detecting means determines a value related to a driven position of said photographing lens upon stopping of a driving of said motor by said motor drive/control means based on a number of said coarse pulse signals counted from said predetermined position for resetting and a number of said fine pulse signals counted after a final one of said coarse pulse signals has been output.

13. An encoder device for a camera according to claim 11, further comprising motor drive/control means for controlling starting and stopping of driving of said motor, wherein:

said position detecting means determines a position of said photographing lens based on a count value of said first count means during a driving of said motor, and determines a value related to a position of said photographing lens based on count values of said first count means and said second count means when a driving of said motor is stopped.

14. An encoder device for a camera according to claim 11, further comprising motor drive/control means for controlling a starting and stopping of driving of said motor, and manual operation means for instructing a driving direction of said photographing lens, wherein:

said motor drive/control means stops a driving of said motor when a predetermined number of said fine pulse signals is counted after said coarse pulse signal has been detected for a first time from a stop of operation of said manual operation means.

15. A position detecting device for detecting a position of a driven member to be driven by drive means, comprising:

coarse pulse signal generating means for generating a coarse pulse signal depending on an amount through which said drive means has been driven,
fine pulse signal generating means arranged at a position where a driving of said drive means is reduced to a lower speed than that at a detecting position occupied by said coarse pulse signal generating means, and generating a fine pulse signal with lower frequency than that of said coarse pulse signal,
count means for counting said coarse pulse signals and said fine pulse signals, respectively, and
position detecting means for detecting the position of said driven member based on coarse and fine pulse counts of said count means.

16. A position detecting device according to claim 15, further comprising edge detecting means for detecting an edge of said fine pulse signal, wherein:

said count means has a first count portion for counting said coarse pulse signals from a reset position, and a second count portion for counting said fine pulse signals, and
said position detecting means detecting a position of said driven member based on a count number of said first count portion upon said edge being detected by said edge detecting means, and a count number of said second count portion after a detection of said edge.

17. A position detecting device comprising:
drive means for driving a driven member,
pulse generating means operated by a drive force transmitted from said drive means to said driven member, for generating a coarse pulse signal and a fine pulse signal corresponding to rotation of said drive means,
count means for counting said coarse pulse signals and said fine pulse signals, respectively,
motor drive/control means for controlling starting and stopping of driving of said drive means, and
means for determining a value related to a position of said driven member upon stopping of driving of said drive means based on a number of coarse pulse signals counted from a reset position and a number of said fine pulse signals counted after generation of said coarse pulse signals has stopped.

18. A position detecting device according to claim 17, further comprising manual operation means for instructing movement of said driven member, wherein:

said drive/control means controls said drive means in response to said instruction.

19. A position detecting device according to claim 18, further comprising edge detecting means for detecting an edge of said coarse pulse signal, wherein:

said drive/control means stops said motor in response to said edge signal detected for the first time by said edge detecting means after stop of a manual operation through said operation means.

20. A position detecting device according to claim 18, further comprising edge detecting means for detecting an edge of said coarse pulse signal, wherein:

said drive/control means executes a stop operation on said drive means after stop of a manual operation through said operation means, and controls said drive means such that said drive means returns depending on a number of said fine pulse signals counted during a time from start of the stop operation to a stopped condition.

21. A position detecting device according to claim 18, further comprising edge detecting means for detecting an edge of said coarse pulse signal, wherein:

said drive/control means stops said drive means upon a count of said fine pulse signals reaching a predetermined pulse number when a manual operation through said operation means is stopped at a time of detection of said edge.

22. A device for driving a photographing lens, comprising:

a driven unit for said photographing lens, an operation member for instructing driving of said driven unit;

drive signal outputting means for outputting a drive signal in response to operation of said operation member, an actuator for outputting a drive force in response to an output from said drive signal outputting means, a transmission mechanism for transmitting the drive force of said actuator to said driven unit, first contactless type signal outputting means provided in one of said transmission mechanism and said driven unit for producing a first pulse output corresponding to movement of said driven unit, second contactless type signal outputting means provided near a drive output portion of said actuator for outputting, corresponding to an output of said actuator, a second pulse output with a shorter pulse interval than that of said first pulse output, and position detecting means for detecting a position of said driven unit based on only said first pulse output while said drive signal is being output from said drive signal outputting means, and a position of said driven unit based on said first pulse output and said second pulse output after outputting of said drive signal has been stopped.

23. A device for driving a photographing lens according to claim 22, wherein said drive signal outputting means outputs said drive signal until issuance of a new first pulse output, when an operation of said operation member is released.

24. A device for driving a photographing lens according to claim 23, wherein said drive signal outputting means outputs said drive signal in one direction until issuance of a new first pulse output when an operation of said operation member is released, and outputs said drive signal in an opposite direction when a predetermined amount of said second pulse outputs are output thereafter.

25. A device for driving a photographing lens, comprising:

a driven unit within said photographing lens, drive signal outputting means for outputting a drive signal tp drive said driven unit, an actuator for outputting a drive force in response to an output from said drive signal outputting means, a transmission mechanism for transmitting the drive force of said actuator to said driven unit, signal outputting means provided in one of said transmission mechanism and in a drive output portion of said actuator and in said driven unit for producing, corresponding to an output of said actuator, at least two types of pulse outputs with different degrees of resolution, and position detecting means for detecting a position of said driven unit based on only a low-resolution pulse output of said two types of pulse outputs during driving of said actuator, and a position of said driven unit based on said two types of pulse outputs after said drive signal to said actuator has been stopped.

26. A device for driving a photographing lens according to claim 25, wherein said position detecting means determines a position of said driven unit based on only a low-resolution pulse output of said two types of pulse outputs during driving of said actuator, and a position of said driven unit after stopping application of said drive signal to said actuator based on a pulse number of said low-resolution pulse outputs and said high-resolution pulse output issued after a final one of said low-resolution pulse outputs has been issued.

27. A position detecting device for a driven unit, comprising:

an actuator serving as a drive source, a transmission mechanism for transmitting a drive output of said actuator to said driven unit, signal outputting means for producing, corresponding to an output of said actuator, at least two types of pulses with different degrees of resolution, and position detecting means for determining a rough position of said driven unit based on a count of low-resolution pulses from said signal outputting means, and a precise position of said driven unit based on counts of said two types of pulses from said signal outputting means.

28. A position detecting device according to claim 27, wherein said position detecting means determines a position of said driven unit based on only low-resolution pulses of said two types of pulses during driving of said actuator, and a position of said driven unit after stop of application of a drive signal to said actuator based on a count of said low-resolution pulses and said high-resolution pulse output after a final one of said low-resolution pulses has been output.

29. A device for driving a zoom lens, comprising:

a driven unit within said zoom lens, an operation member for instructing a driving direction of said driven unit, drive signal outputting means for outputting a drive signal in response to operation of said operation member, an actuator for outputting a drive force in response to an output from said drive signal outputting means, a transmission mechanism for transmitting a drive force of said actuator to said driven unit, signal outputting means for outputting, corresponding to an output of said actuator, at least two types of pulses with different degrees of resolution, and position detecting means for detecting a wide-angle end or a telephoto end of a focal length of said zoom lens responsive to low-resolution pulses from said signal outputting means, and a focal length between said wide-angle end and said telephoto end responsive to said two types of pulses from said signal outputting means.

30. A device for driving a zoom lens according to claim 29, wherein said drive signal outputting means stops outputting a drive signal to said actuator upon one of said wide-angle end and said telephoto end being detected by said position detecting means, even if said operation member is operated.

31. A device for driving a photographing lens, comprising:
   a driven unit within said photographing lens,
   an operation member for instructing driving of said driven unit;
   drive signal outputting means for outputting a drive signal in response to operation of said operation member,
   an actuator for outputting a drive force in response to an output from said drive signal outputting means,
   a transmission mechanism for transmitting a drive force of said actuator to said driven unit,
   first signal outputting means provided in one of said transmission mechanism and said driven unit for producing a first pulse output corresponding to movement of said driven unit,
   second signal outputting means provided near a drive output portion of said actuator for producing, corresponding to an output of said actuator, a second pulse output of a frequency a predetermined times higher than that of said first pulse output, and
   position detecting means for detecting a position of said driven unit responsive to said first pulse output and said second pulse output.

32. A device for driving a photographing lens according to claim 31, wherein said position detecting means determines a rough position of said driven unit based on said first pulse output, and a precise position of said driven unit based on said first pulse output and said second pulse output.

33. A device for driving a driven unit, comprising:
   an actuator as a drive source,
   a transmission mechanism for transmitting a drive force of said actuator to said driven unit,
   first signal outputting means provided in one of said transmission mechanism and said driven unit for producing a first pulse output corresponding to movement of said driven unit,
   second signal outputting means provided near a drive output portion of said actuator for producing, corresponding to an output of said actuator, a second pulse output of a frequency a predetermined times higher than that of said first pulse output, and
   position detecting means for detecting a position of said driven unit responsive to said first pulse output and said second pulse output.

34. A device for driving a driven unit according to claim 33, wherein said position detecting means determines a rough position of said driven unit based on said first pulse output, and a precise position of said driven unit based on said first pulse output and said second pulse output.

35. A driving device having a transmission mechanism for transmitting a drive output of an actuator as a drive source to a driven unit, said device comprising:
   first signal outputting means provided in one of said transmission mechanism and said driven unit for producing a first pulse output corresponding to movement of said driven unit, and
   second signal outputting means provided near a drive output portion of said actuator for producing, corresponding to an output of said actuator, a second pulse output having a frequency a predetermined times higher than that of said first pulse output.

36. A driving device according to claim 35, further comprising position detecting means for determining a rough position of said driven unit based on said first pulse output, and a precise position of said driven unit based on said first pulse output and said second pulse output.

37. A driving device in which a drive output of an actuator drives a driven unit via a drive force transmitting mechanism, said device comprising:
   first signal outputting means for producing a first pulse output corresponding to movement of said driven unit,
   second signal outputting means for producing a second pulse output corresponding to a output of said actuator, and
   position detecting means for detecting the position of said driven unit based on said first pulse output and said second pulse output.

38. A driving device according to claim 37, further comprising position detecting means for determining a rough position of said driven unit based on said first pulse output, and a precise position of said driven unit based on said first pulse output and said second pulse output.

39. A focal length detecting means for a photographing lens, comprising:
   a cam ring,
   a lens barrel causing a focal length of a lens to be changed responsive to rotation of said cam ring,
   drive means for selectively driving said cam ring in one of two opposing directions,
   first output means for outputting a pulse signal corresponding to a driving of said cam ring,
   second output means for outputting a pulse signal with a higher frequency than that of a pulse signal from said first output means, corresponding to a driving of said cam ring, and
   means for counting up or down pulses from said first output means and pulses from said second output means depending on the driving direction, wherein:
   pulses from said first output means are counted during driving of said cam ring,
   pulses from said first output means and pulses from said second output means being counted until stop of said cam ring after said drive means has output a signal to stop driving the cam ring, and
   a focal length of said lens is detected based both of said counts.

40. A focal length detecting device according to claim 39, further comprising third output means for outputting a third signal when said cam ring is driven to a predetermined position, wherein:
   said pulse count values are reset to a predetermined value responsive to said third signal.

41. A focal length detecting device according to claim 40, wherein said third output means further comprises end detecting means for detecting a point in time when said cam ring is driven in one direction and stopped at a given position, wherein:
   a signal from said end detecting means is used as said third signal.

42. A focal length detecting device according to claim 39, wherein said pulse signal generating means is an optical detecting means.

43. A focal length detecting device according to claim 39, wherein said pulse signal generating means is a light detecting means.

44. A position detecting device for a movable member comprising:
   drive means;
   transmission coupling means having an input coupled to a drive output of said drive means and having an output for coupling a driving force derived from said drive means to said driven member;
   first detection means for detecting a drive at one of said drive means output and said transmission coupling means input for generating pulses representative of a drive force detected by said first detection means;
   second detection means for generating pulses representative of a driving force at one of said transmission coupling means output and said driven member representative of a drive force detected by said second detection means;
   the pulses generated by said first and second detection means being at different frequency rates;
   means for counting said pulses; and
   means for determining a position of said driven member based on said pulse count.

45. A position detecting means according to claim 44 wherein said transmission coupling means comprising a gear train coupled between said drive means and said driven member whereby angular speeds at an input and an output of said gear train are different.

46. A position detecting means according to claim 44 wherein said detecting means are contactless detecting devices.

47. A position detecting means according to claim 46 wherein said contactless detecting means comprises light detecting means.

48. A position detecting means according to claim 47 wherein each of said light detecting means comprises a rotatable slitted disk driven responsive to a drive force imparted thereto; and
   means for detecting said slits in said slitted disk.

49. A position detecting means according to claim 48 wherein said slit detecting means comprises a cooperating light source and light detecting means arranged on opposite sides of said disk.

50. A position detecting means according to claim 44 further comprising means for initially counting the lower frequency pulses and thereafter counting the higher frequency pulses when said drive means is halted.

51. A method for detecting a position of a driven member operated by a drive means and transmission coupling means coupled between said drive means and said driven member wherein a rotational output at said drive means has an operating frequency which is different from a rotational output at said driven member, said method comprising the steps of:
   (a) generating pulses representing a rotation at said drive means output;
   (b) means for generating pulses representative of a rotation at said driven member;
   (c) counting pulses generated during step (a);
   (d) counting pulses generated during step (b); and
   (e) utilizing the counts developed during steps (c) and (d) to determine a position of said driven member.

52. A method according to claim 51 wherein said pulses counted during step (d) are counted only after said drive means is halted.

53. A method for positioning an adjustable focal length optical lens system including a drive means and transmission coupling means for coupling an output of said drive means to said optical lens system, said method comprising the steps of:
   (a) generating pulses at a rate representative of an output at said drive means;
   (b) generating pulses at a rate representative of a drive force at said optical system;
   (c) counting pulses generated during step (a);
   (d) comparing the count obtained during step (c) with a predetermined count stored in a memory and representative of a predetermined optical lens system position;
   (e) halting said drive means when the counts compared in step (d) equal one another;
   (f) counting the pulses generated during step (b) responsive to halting of said drive means;
   (g) determining a position of said optical lens system based on the counts developed during steps (c) and (f).

54. An encoder device for a camera according to claim 1, wherein said second pulse generating means includes:
   a fine signal slitted disk provided on one of a rotating shaft of said motor and a gear in said gear train near said motor rotating shaft to rotate with rotation of said motor, and
   a photo-interrupter disposed in a path of rotation of said slitted disk for outputting said fine pulse signal.

* * * * *

UNITED STATES PATENT AND TRADEMARK OFFICE
CERTIFICATE OF CORRECTION

PATENT NO. : 5,287,137
DATED : February 15, 1994
INVENTOR(S) : Minoru Hara and Kazuhiro Satoh Page 1 of 2

It is certified that error appears in the above-indentified patent and that said Letters Patent is hereby corrected as shown below:

Column 1, line 8 change "photographic" to --photographing--.

Column 1, line 27 after "contact" insert --with--.

Column 1, line 28 delete "with".

Column 2, line 63 change "fast" to --last--.

Column 3, line 15 change "group" to --groups--.

Column 3, line 54 change "processin" to --process in--.

Column 4, line 24 change "position" to --portion--.

Column 5, line 6 change "arrow B" to --(arrow B)--.

Column 5, line 39 change "extend" to --extent--.

Column 7, line 44 change "integral" to --integral,--.

Column 12, line 55 change "steps" to --stops--.

UNITED STATES PATENT AND TRADEMARK OFFICE
CERTIFICATE OF CORRECTION

PATENT NO. : 5,287,137
DATED : February 15, 1994
INVENTOR(S) : Minoru Hara and Kazuhiro Satoh It is certified that error appears in the above-indentified patent and that said Letters Patent is hereby corrected as shown below:

Column 21, Claim 25, line 68 change "tp" to --to--.

Column 24, Claim 37, line 19 change "a" to --an-- and line 10 change "the" to --a--.

Signed and Sealed this

Fourth Day of October, 1994

Attest:

BRUCE LEHMAN

Attesting Officer

Commissioner of Patents and Trademarks